US010255527B2

(12) United States Patent
Kriegman et al.

(10) Patent No.: US 10,255,527 B2
(45) Date of Patent: *Apr. 9, 2019

(54) GENERATING AND UTILIZING NORMALIZED SCORES FOR CLASSIFYING DIGITAL OBJECTS

(71) Applicant: DROPBOX, INC., San Francisco, CA (US)

(72) Inventors: David J. Kriegman, San Diego, CA (US); Peter N. Belhumeur, New York, NY (US); Thomas Berg, San Francisco, CA (US); Nils Peter Welinder, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,469

(22) Filed: Sep. 21, 2017

(65) Prior Publication Data

US 2018/0012109 A1 Jan. 11, 2018

Related U.S. Application Data

(63) Continuation of application No. 14/986,585, filed on Dec. 31, 2015, now Pat. No. 9,846,822.

(51) Int. Cl.
*G06K 9/62* (2006.01)
*G06K 9/66* (2006.01)

(52) U.S. Cl.
CPC ............. *G06K 9/6277* (2013.01); *G06K 9/62* (2013.01); *G06K 9/6212* (2013.01); *G06K 9/6292* (2013.01); *G06K 9/66* (2013.01)

(58) Field of Classification Search
CPC ........ G06K 9/00; G06K 9/00288; G06K 9/62; G06K 9/627; G06K 9/00221; G06K 9/00664; G06K 9/6267; G06K 9/6218; G06K 9/00369; G06K 9/6211; G06K 9/00201; G06K 9/00147; G06N 7/005;
(Continued)

(56) References Cited

U.S. PATENT DOCUMENTS 6,092,058 A * 7/2000 Smyth ................ A61B 5/04842
600/554
6,295,367 B1 * 9/2001 Crabtree ............... G01S 3/7865
382/103
(Continued)

OTHER PUBLICATIONS

U.S. Appl. No. 14/986,585, dated Feb. 27, 2017, Office Action.
U.S. Appl. No. 14/986,585, dated Jun. 21, 2017, Notice of Allowance

*Primary Examiner* — Aklilu K Woldemariam
(74) *Attorney, Agent, or Firm* — Keller Jolley Preece

(57) ABSTRACT

The present disclosure is directed toward systems and methods that enable more accurate digital object classification. In particular, disclosed systems and methods address inaccuracies in digital object classification introduced by variations in classification scores. Specifically, in one or more embodiments, disclosed systems and methods generate probability functions utilizing digital test objects and transform classifications scores into normalized classification scores utilizing probability functions. Disclosed systems and methods utilize normalized classification scores to more accurately classify and identify digital objects in a variety of applications.

20 Claims, 11 Drawing Sheets

(58) Field of Classification Search
CPC ............... G06N 99/005; G06T 7/90; G06T 2207/10016; G06T 7/11; G06T 7/162; G06T 2207/30148; G06T 7/0012; G06T 7/44; H04N 2201/0084; G06F 17/30247; G06F 17/30253; G06F 17/30256; G06F 17/30259; G06F 17/30277; G06F 17/3053; G06F 19/24; G06F 19/26; G01S 3/7865; G08B 13/19602; G08B 13/19608; G08B 13/19673; G06Q 30/02; G06Q 30/0239; H04W 4/021; C07K 2317/34; C12N 2310/53; G01N 21/956; H01L 22/12; A61B 5/7264; A61B 5/7267
USPC .................. 382/103, 190, 100, 197, 224
See application file for complete search history.

(56) References Cited

U.S. PATENT DOCUMENTS

| | | | | |
|---|---|---|---|---|
| 7,492,921 | B2 * | 2/2009 | Foote | G06F 17/30247 382/100 |
| 7,912,246 | B1 * | 3/2011 | Moon | G06K 9/00221 382/103 |
| 2004/0264780 | A1 * | 12/2004 | Zhang | G06F 17/30265 382/224 |
| 2006/0098865 | A1 * | 5/2006 | Yang | G06K 9/00362 382/159 |
| 2009/0070095 | A1 * | 3/2009 | Gao | G06F 17/2827 704/2 |
| 2009/0100050 | A1 * | 4/2009 | Erol | G06F 17/30026 |
| 2010/0086215 | A1 * | 4/2010 | Bartlett | G06K 9/00335 382/197 |
| 2013/0294642 | A1 * | 11/2013 | Wang | G06F 17/30855 382/103 |
| 2013/0315477 | A1 * | 11/2013 | Murray | G06F 17/30265 382/159 |
| 2013/0336547 | A1 * | 12/2013 | Komogortsev | A61B 5/1171 382/117 |
| 2014/0079297 | A1 * | 3/2014 | Tadayon | G06K 9/00 382/118 |
| 2015/0033362 | A1 * | 1/2015 | Mau | G06K 9/00288 726/27 |
| 2015/0049910 | A1 * | 2/2015 | Ptucha | G06F 17/30256 382/103 |
| 2015/0131899 | A1 * | 5/2015 | Lu | G06K 9/6256 382/159 |
| 2015/0169645 | A1 * | 6/2015 | Li | G06F 17/30277 707/722 |
| 2015/0228077 | A1 * | 8/2015 | Menashe | G01S 5/163 382/103 |
| 2016/0092790 | A1 * | 3/2016 | Ribeiro Mendes J Nior | G06N 99/005 706/12 |
| 2016/0148074 | A1 * | 5/2016 | Jean | G06K 9/4671 382/190 |
| 2016/0148077 | A1 * | 5/2016 | Cox | G06K 9/00288 382/159 |
| 2017/0193337 | A1 | 7/2017 | Kriegman et al. | |

* cited by examiner

GENERATING AND UTILIZING NORMALIZED SCORES FOR CLASSIFYING DIGITAL OBJECTS

CROSS REFERENCE TO RELATED APPLICATIONS

This application is a continuation of U.S. application Ser. No. 14/986,585, filed Dec. 31, 2015. The aforementioned application is hereby incorporated by reference in its entirety.

BACKGROUND

1. Technical Field

One or more embodiments of the present invention relate generally to digital object classification. More specifically, one or more embodiments of the present invention relate to generating normalized classification scores for digital images, electronic documents, and other digital content.

2. Background and Relevant Art

Individuals and businesses increasingly rely on computing devices to identify and classify digital objects. For example, in light of the recent proliferation of digital cameras in handheld devices, individuals now commonly manage personal digital image collections containing thousands of digital images. Many individuals utilize computing devices to classify these digital images based on, for example, the contents (e.g., a particular individual, pet, item, or location, etc.) of the digital images. Similarly, businesses and individuals commonly utilize computing devices to classify digital files, digital content (e.g., advertisements or other digital content for users), and other digital objects in a variety of ways.

Conventional digital classification systems operate by generating classification scores to classify objects using one or more classification models. These conventional systems typically train the classification models using training data, such as digital objects that have been tagged or otherwise labeled with one or more known classifications. Using the trained models, conventional digital classification systems generate classification scores and then use the classification scores to classify digital objects. For example, with regard to identifying objects in an image, common digital classification systems can generate classification scores with regard to the likelihood that an object portrayed in a digital image corresponds to a known object (e.g., a known person) from other images (e.g., images used to train the classification models). Common classification systems can then compare the generated classifications scores (to other classification scores and/or to a threshold) to identify the object portrayed in the digital image.

Although conventional classification systems have proven very useful, they still suffer from a number of shortcomings. For instance, conventional classification systems often have difficulty accurately classifying digital objects with regard to multiple possible classifications and multiple corresponding classification scores. As one example, and as will be described in greater detail below, some common classification systems can have difficulty accurately utilizing multiple classification scores to identify whether an unknown object in an image corresponds to a first object, a second object, or some other object. Indeed, in many conventional systems, generating and comparing multiple classification scores to classify a digital object leads to inaccurate classifications, even where users attempt to provide additional information (i.e., training data) to generate more accurate classification models.

Accordingly, there is much to be considered in terms of accurately classifying digital objects.

SUMMARY

One or more embodiments of the present disclosure provide benefits and/or solve one or more of the foregoing or other problems in the art with systems and methods that generate and utilize classification scores to classify digital objects. In particular, the disclosed systems and methods provide normalized classification scores that lead to increased classification accuracy. Specifically, the amount of training data available to train a classification model (e.g., the number of digital objects having a particular known classification, such as the number of "training images" used to train a facial recognition model) can affect resulting classification scores in a way that leads to classification inaccuracies.

As an example, as the number of tagged digital training objects (e.g., digital images tagged as including a particular person and utilized to train a classification model) increases, the resulting classification scores generally increase. To illustrate, if a classification model is trained with ten digital training images tagged as including a first person, but only one digital training image tagged as including a second person, the classification model is, on average, likely to generate higher classification scores for the first person than for the second person. This tends to skew classification models to identify the first person, rather than the second person, in analyzing subsequent probe digital images. In particular, in subsequently classifying a probe digital image having unknown contents, the trained classification model could generate a first classification score for the first person (i.e., indicating a likelihood that the probe digital image includes the first person) that is higher than a generated second classification score for the second person (i.e., indicating a likelihood that the probe digital image includes the second person), even if the probe digital image actually includes the second person and not the first person. As one will appreciate, this problem leads to a number of inaccurate classifications.

The disclosed systems and methods remedy this problem by normalizing classification scores based on the amount of training data (e.g., the numbers of tagged digital training images or tagged digital training objects) used to train the corresponding classification model(s). In this way, the disclosed systems and methods are able to accurately classify unknown digital objects in probe digital images across a plurality of potential classifications despite initially having varying amounts of training data associated with each of the plurality of potential classifications.

For example, in one or more embodiments, the disclosed systems and methods identify a set of one or more digital training images tagged with information identifying a known object, wherein the known object is portrayed in each image in the set of one or more tagged digital training images. Then, the disclosed systems and methods, utilizing the information from the set of one or more tagged digital training images (e.g., using a classification model trained to classify images as including the known object), generate a classification score with regard to an unknown object portrayed in a probe digital image. Specifically, in one or more embodiments, the classification score indicates a likelihood that the unknown object portrayed in the probe digital image corresponds to the known object portrayed in the set of one or more tagged digital training images. Moreover, the disclosed systems and methods transform the classification score into a normalized classification score based on the number of tagged digital training images. Based on the normalized classification score, the disclosed systems and methods can determine whether the unknown object portrayed in the probe digital image corresponds to the known object portrayed in the set of one or more tagged digital training images.

By transforming classification scores into normalized classification scores based on a number of tagged digital training objects, the disclosed systems and methods can more accurately classify unknown digital objects. In particular, the systems and methods can compare normalized classification scores that more accurately reflect a relative probability that an unknown digital object belongs to a particular classification. By controlling the inaccuracies caused by the variability in the numbers of tagged digital training objects associated with each of a plurality of classifications (e.g., the numbers of tagged digital training objects used to train a corresponding classification model) the disclosed systems and methods more accurately identify classifications corresponding to particular unknown digital objects.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
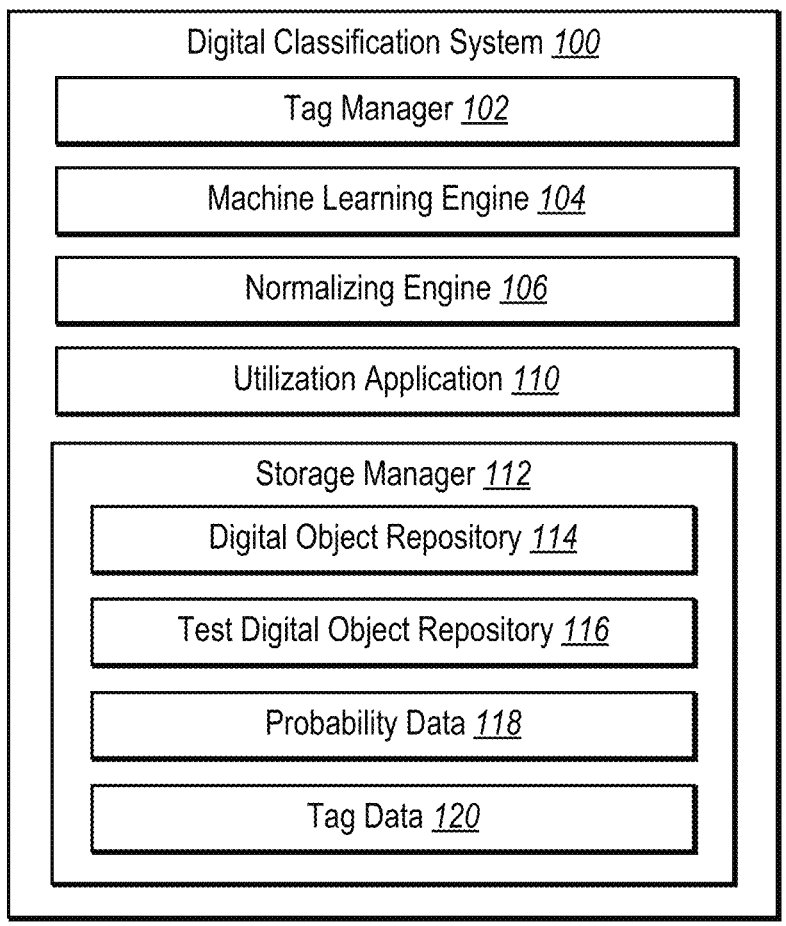
FIG. 1 illustrates a schematic diagram of a digital classification system in accordance with one or more embodiments.

One or more embodiments of the present disclosure include an improved digital classification system and corresponding methods. In particular, in one or more embodiments, the digital classification system classifies unknown digital objects while controlling for variations in classification scores that lead to classification inaccuracies. Specifically, in one or more embodiments, the digital classification system accounts for inaccuracies attributable to variations in the amount of training data utilized to generate classification models. More specifically, the digital classification system can transform classification scores into normalized classification scores by accounting for the number of tagged digital training objects utilized to train corresponding classification models.

In one or more embodiments, the digital classification system identifies a set of one or more digital training images tagged with information identifying a known object. Moreover, the digital classification system generates a classification score (e.g., utilizing a trained classification model) with regard to an unknown object portrayed in a probe digital image, wherein the classification score indicates a likelihood that the unknown object portrayed in the probe digital image corresponds to the known object portrayed in the set of one or more tagged digital training images. Furthermore, the digital classification system transforms the classification score into a normalized classification score based on the number of tagged digital training images. Based on the normalized classification score, the digital classification system determines whether the unknown object portrayed in the probe digital image corresponds to the known object portrayed in the set of one or more tagged digital training images.

By transforming a classification score into a normalized classification score based on the number of tagged digital training objects (i.e., the number of tagged training objects utilized to train a classification model), the digital classification system can more accurately classify unknown digital objects. For example, the digital classification system can more accurately apply classification models and determine that an unknown person portrayed in a probe digital image corresponds to a known person portrayed in a set of one or more digital training images.

In one or more embodiments, the digital classification system accounts for variations in classification scores resulting from differences in the amount of training data utilized to generate classification models by calculating probabilities corresponding to the classification scores. For example, in one or more embodiments, the digital classification system calculates a probability of obtaining a classification score given a particular number of tags utilized to generate a classification model.

In one or more embodiments, the digital classification system calculates one or more probabilities by generating a probability function. In particular, the digital classification system generates one or more probability functions from a set of digital test images containing known objects. Specifically, the digital classification system can generate one or more probability functions reflecting the probability of returning classification scores given a particular number of tags. More specifically, the digital classification system can generate a positive probability function specific to a particular number of tags (e.g., a number of tagged digital training images) and an imposter probability function specific to a particular number of tags.

Moreover, in one or more embodiments, the digital classification system utilizes calculated probabilities (e.g., probabilities calculated from one or more probability functions) to generate a normalized classification score. In particular, in one or more embodiments, the digital classification system utilizes probabilities to control for variation in the number of tagged digital training images utilized to generate a classification model. For instance, the digital classification system can utilize the probability function to generate a normalized score that reflects the probability that an unknown digital object belongs to a classification (i.e., is a positive match) given the generated classification score. Similarly, the digital classification system can utilize the probability function to generate a normalized score that reflects the probability that an unknown object is an imposter.

Furthermore, upon generating normalized classification scores, in one or more embodiments, the digital classification system can utilize the normalized classification scores to classify unknown digital objects. For example, the digital classification system can compare normalized classification scores to determine whether an unknown object corresponds to a particular classification (or an imposter). Similarly, the digital classification system can compare normalized classification scores to one or more thresholds to identify imposters. In this manner, the digital classification system can classify unknown digital objects utilizing one or more normalized classification scores that account for variation in the number of tags (e.g., the number of tagged digital training objects).

As used herein, the term "digital object" refers to any digital data, file, or item (or part thereof). In particular, the term "digital object" includes any digital item capable of being classified or grouped based on one or more characteristics of the digital object. For example, the term "digital object" includes a digital image. Moreover, the term "digital object" can refer to a digital advertisement, digital media file, digital audio file, digital video file, digital text file, or other digital item or portion thereof.

As used herein, the term "digital image" refers to any visual digital representation of a person, thing, location, or other object (e.g., individuals, animals, vehicles, tools, scenes, scientific images, or medical images). For instance, the term "digital image" includes digital symbols, digital pictures, digital icons, digital illustrations, or any other digital representation. The term "digital image" includes, for example, digital images with the following file extensions: JPG, TIFF, GIF, BMP, PNG, RAW, or PDF.

As used herein, the term "digital training objects" (or digital training images) refers to digital objects utilized to train a machine learning algorithm. In particular, the term "digital training objects" refers to objects utilized to generate a classification model. For example, the term "digital training objects" can refer to digital training images portraying known digital objects that are provided to a machine learning algorithm and utilized to train a classification model operable to identify a classification corresponding to an unknown digital object in a probe digital image.

As used herein, the term "classification" refers to a group or category. In particular, the term "classification" includes a group or category of digital objects. For example, a "classification" can include digital objects having one or more common characteristics or features. Specifically, a "classification" can include a group of all digital images portraying a particular person. Similarly, a "classification" can include a set of digital objects with content addressing a particular topic. Moreover, a "classification" can include a set of digital objects that a user finds interesting (e.g., advertisements that a user selects, reads, or clicks). The term "classification" can include any category or group of digital objects connected by any set of one or more common characteristics or features.

As used herein, the term "tag," refers to information identifying and/or classifying a digital object. For instance, the term "tag" includes information identifying a characteristic or feature of a digital object. In particular, the term "tag" includes information identifying a characteristic or feature of a digital object that can be utilized to classify the digital object into one or more classifications. For example, the term "tag" includes digital information identifying a classification of an object portrayed in a digital image. Specifically, a tag may include digital data identifying the name of a person portrayed in a digital image. A tag may include identifying information of any type or kind. For instance, with regard to a person represented in a digital object, a tag can include information identifying age, ethnicity, gender, conduct, historical practice, interest, demographic information, or other identifying information. Similarly, a tag may include information identifying size, type, name, title, content, or topic of a digital object. A tag can be stored in any form, including metadata corresponding to a digital object, a database, or some other form.

Correspondingly, as used herein, the term "tagged," refers to a digital object associated with a tag. Thus, a tagged digital object includes a digital object with corresponding information identifying the digital object. Similarly, a tagged digital image comprises a digital image with information classifying the digital image and/or one or more objects represented in the tagged digital image.

Similarly, the term "known" refers to a digital object that has already been identified as belonging to a classification. Thus, the term "known digital object" includes digital objects that have been tagged with information identifying a classification corresponding to the digital object. Thus, a "known digital object" includes, for example, a known object portrayed in a digital image, where the digital object has been tagged with information indicating that the portrayed object is a particular person (e.g., tagged with the name or identity of the person).

Conversely, the term "unknown" refers to a digital object that is sought to be identified (e.g., identified as belonging to a classification). The term "unknown digital object" includes a digital object that the digital classification system (or a user) seeks to classify to a particular classification. Thus, the term "unknown digital object" includes a digital image portraying a person that the digital classification system seeks to identify. Similarly, as used herein, the term "probe digital image" refers to a digital image having an unknown classification (e.g., portraying one or more unknown persons).

As used herein, the term "classification score" refers to a rating with regard to whether a digital object corresponds to a classification. For instance, the term "classification score" includes a rating with regard to whether an unknown digital object belongs to a class (or set) of known digital objects. The term "classification score" includes scores generated by machine learning algorithms (e.g., classification models or, simply, classifiers) to identify the likelihood that a digital object belongs to a particular classification.

As used herein, the term "probability function" refers to a function that defines the relative likelihood that a random variable will take on a given value. The term "probability function" includes a function that defines the relative likelihood a classification score will take on a given value. Similarly, the term "probability function" includes a function that defines the relative likelihood that a classification score will take on a given value given a number of tagged digital training objects utilized to train the classification model used to generate the classification score.

Similarly, as used herein, the term "digital test object" (or digital test image) refers to a digital object utilized to generate a probability function. In particular, the term "digital test object" includes a digital object provided to a classification model for generating one or more test data samples (e.g., test data samples utilized to calculate a probability of returning one or more classification scores, as described below).

As used herein, the term "imposter" refers to a digital object that does not correspond to one or more classifications. For example, the term "imposter" can describe a digital object that does not belong to a particular class (but that may be confused for a digital object that does belong to the particular class). For instance, the term "imposter" includes an unknown object portrayed in a probe digital image that does not correspond to known digital objects in a set of tagged digital training images. Similarly, the term "imposter" includes digital objects that do not correspond to any classifications defined by tagged digital objects in a repository of digital objects.

Turning now to FIG. 1, additional detail will be provided regarding components and capabilities of an example digital classification system in accordance with one or more embodiments. In particular, FIG. 1 illustrates an example embodiment of digital classification system 100 (e.g., the digital classification system described above). As illustrated in FIG. 1, digital classification system 100 may include, but is not limited to, tag manager 102, machine learning engine 104, normalizing engine 106, utilization application 110, and storage manager 112. Moreover, as illustrated, storage manager 112 also includes digital object repository 114, test digital object repository 116, probability data 118, and tag data 120.

As just mentioned, and as shown in FIG. 1, digital classification system 100 can include tag manager 102. Tag manager 102 can generate, identify, detect, receive, determine, apply or create one or more tags. As discussed above, tags include information identifying one or more characteristics of a digital object (e.g., information identifying one or more characteristics that can be utilized to classify a digital object). For instance, tag manager 102 can determine a tag (i.e., identifying information) with regard to one or more digital objects.

For example, in one or more embodiments, tag manager 102 receives a tag based on user input. For instance, in one or more embodiments, tag manager 102 identifies user input indicating identifying information with regard to a digital object. More specifically, tag manager 102 can receive user input of a name (or title or relationship) identifying a person portrayed in a digital image.

In addition to user input, tag manager 102 can identify tags in a variety of ways. For instance, tag manager 102 can detect characteristics or features of a digital object. For example, tag manager 102 can utilize feature recognition technology or object recognition technology to detect one or more features or characteristics of a digital image. Similarly, tag manager 102 can access a user profile indicating characteristics of one or more individuals. In addition, tag manager 102 can detect various characteristics of a digital object, such as size, type, content, topic, title, or other characteristics.

In addition, tag manager 102 can utilize any identifying information as a tag. As just mentioned, tag manager 102 can utilize a name, relation, or title of an individual as a tag. Similarly, tag manager 102 can utilize any demographic information as a tag, including, age, ethnicity, gender, location, or marital status. Moreover, tag manager 102 can utilize user conduct as a tag, such as user history, prior user interactions with one or more computing devices or applications, purchase history, clicks, files retrieved, applications utilized, etc. Similarly, tag manager 102 can utilize user interests as tags. Furthermore, tag manager 102 can utilize information regarding a client device as a tag, such as device type, operating system, applications installed or utilized, memory, processing speed, or other capabilities. In addition, as mentioned previously, tag manager 102 can utilize information regarding characteristics or features of a digital object as a tag, including file type, size, content, topics, titles, or other identifying information.

Tag manager 102 can obtain or determine tags from any available source. For instance, as mentioned previously, tag manager 102 can determine tags based on user input. In addition, tag manager 102 can store and obtain tags from user profiles. Moreover, tag manager 102 can detect tags from user history, social media, third party sources, or any other information source (whether on a client device or on a remote server).

Tag manager 102 can also utilize tags to identify one or more sets of digital objects sharing one or more characteristics. For instance, tag manager 102 can identify all digital images in a repository of electronic document tagged with information identifying a particular person portrayed in the digital images. Tag manager 102 can also identify all images in a repository of electronic documents tagged with information identifying red-headed persons, female persons, or elderly persons portrayed in the digital images. Similarly, tag manager 102 can gather all images tagged with dogs.

In addition to digital images, tag manager 102 can utilize tags to identify other digital objects. For example, tag manager 102 can gather all digital objects read, viewed, or clicked by a user. Similarly, tag manager 102 can gather all digital objects related to a particular topic (e.g., digital objects related to sports or digital objects of interest to a particular person). Thus, tag manager 102 can utilize tags to gather digital objects into any type or variety of classifications.

As mentioned above, and as illustrated in FIG. 1, digital classification system 100 may further include machine learning engine 104. In one or more embodiments, machine learning engine 104 trains, operates, utilizes, or runs one or more machine learning algorithms. In particular, machine learning engine 104 can utilize machine learning algorithms to generate one or more trained classification models. Moreover, machine learning engine 104 can utilize trained classification models to generate one or more classification scores with regard to digital objects. In addition, machine learning engine 104 can utilize machine learning algorithms to generate test data samples (e.g., test data samples utilized by normalizing engine 106 to generate probability functions).

Machine learning engine 104 can operate in conjunction with a variety of machine learning algorithms or techniques. For example, in one or more embodiments, machine learning engine 104 utilizes a support vector machine (i.e., support vector network) to analyze data and recognize patterns for classification analysis. Similarly, machine learning engine 104 can utilize a variety of other types of machine learning techniques, including deep learning, decision trees, ensembles, k-NN, linear regression, neural networks, logistic regression, perceptron, or relevance vector machine algorithms. Moreover, machine learning engine 104 can utilize any machine learning technique that generates a classification score.

In one or more embodiments, machine learning engine 104 trains one or more machine learning algorithms to classify digital objects (e.g., classification models). In particular, machine learning engine 104 can train one or more machine learning algorithms with tags (e.g., tags corresponding to digital training objects) such that machine learning engine 104 generates a trained classification model. For instance, machine learning engine 104 can provide a machine learning algorithm with tags corresponding to a classification of digital training objects. The machine learning algorithm can learn from the provided tags and digital training objects corresponding to the classification and generate a trained classification model capable of identifying a classification score with regard to unknown digital objects. For example, machine learning engine 104 can provide tags identifying a particular person portrayed in a set of digital images and generate a trained classification model that can generate a classification score indicating whether additional images portray the particular person.

Similarly, as mentioned previously, machine learning engine 104 can train a machine learning algorithm for the purpose of generating test data samples. For instance, in one or more embodiments machine learning engine 104 accesses a repository of digital training objects. In particular, in one or more embodiments, machine learning engine 104 accesses a repository of digital training objects (e.g., test digital object repository 116), where the classification of each digital training object is known. For example, as described above, machine learning engine 104 can access a repository of digital training images, where the digital training images portray known objects (e.g., persons or things) that have previously been classified (e.g., persons in digital test images have already been identified).

Machine learning engine 104 can utilize a repository of digital training images to train a test machine learning algorithm and produce a variety of test data samples. For instance, machine learning engine 104 can provide a test machine learning algorithm with a tagged digital training image, wherein the tag identifies a person portrayed in the tagged digital training image. In this manner, the test machine learning algorithm can generate a test trained classification model.

Moreover, machine learning engine 104 can provide a digital test object to the test trained classification model to generate test data samples. For example, machine learning engine 104 can obtain digital test objects from test digital object repository 116 and provide the digital test objects to the trained classification model. More specifically, in one or more embodiments, machine learning engine 104 provides an image from a repository of digital test images to the trained test classification model. For example, machine learning engine 104 can provide a positive digital test image (e.g., a digital test image portraying a person that corresponds to a person portrayed in tagged digital training images) or an imposter digital test image (e.g., a digital test image portraying an imposter that is not the person portrayed in tagged digital training images).

In one or more embodiments, machine learning engine 104 utilizes the trained test classification model and the digital test objects to generate test classification scores. In particular, machine learning engine 104 generates positive test classification scores corresponding to positive digital test images and imposter classification scores corresponding to imposter digital test images. More specifically, machine learning engine 104 generates positive test classification scores and imposter test classification scores and records the number of tags utilized to train the trained test classification model that produces the classification scores. Thus, for example, machine learning engine 104 can generate a plurality of test classification scores utilizing a trained test classification model trained with a single tagged digital test image. Machine learning engine 104 can store the classification score as a test data sample. In this manner, machine learning engine 104 can generate data points indicating classification scores calculated based on a single tagged digital image.

In addition, machine learning engine 104 can generate different trained test classification models utilizing a different number of tagged digital test objects. For example, machine learning engine 104 can generate trained test classification models utilizing two, three, four, or sixty-four digital test images tagged with information identifying a person portrayed in each digital test image. Moreover, machine learning engine 104 can provide the trained test classification model with digital test images (i.e., positive digital test images or imposter digital test images) and generate classification scores. In this manner, machine learning engine 104 can generate data points indicating classification scores when utilizing trained test classification models generated with a variety of different numbers of tagged digital training images.

As mentioned above, and as illustrated in FIG. 1, digital classification system 100 may further include normalizing engine 106. Normalizing engine 106 can generate, calculate, or create one or more normalized classification scores. In particular, normalizing engine 106 can transform one or more classification scores into a normalized classification score. More specifically, normalizing engine 106 can transform one or more classification scores into a normalized classification score reflecting the probability that an unknown digital object corresponds to a known classification of digital training objects.

Indeed, although machine learning engine 104 can generate classification scores, in many instances, the classification scores are not accurately comparable to other classification scores. For instance, a trained classification model generated with one-hundred tagged digital training images corresponding to a first person can produce a first classification score. A trained classification model generated with ten tagged digital training images corresponding to a second person can produce a second classification score. The machine learning algorithm trained with more tagged digital training images tends to produce higher classification scores whereas machine learning algorithms trained with fewer digital training images tend to produce lower classification scores. Accordingly, because of an uncontrolled variable (e.g., the number of tags), the first classification score and the second classification score are not calibrated for accurate comparison. Moreover, providing additional identifying information (i.e., tags) can actually further exacerbate the problem by producing a greater disparity in the commutability of the classification scores.

Normalizing engine 106 can assist in resolving this newly discovered problem. In particular, normalizing engine 106 can generate normalized classification scores that are calibrated to compare to other normalized classification scores. In particular, in one or more embodiments, normalizing engine 106 can generate a normalized classification score that reflects a probability that can be compared to other normalized classification scores.

For example, in one or more embodiments, normalizing engine 106 generates probability functions. In particular, normalizing engine 106 can generate probability functions based on test data samples (e.g., samples from machine learning engine 104). For instance, normalizing engine 106 can generate probability functions based on test data samples reflecting test classification scores based on a number of tags.

More specifically, normalizing engine 106 can gather a plurality of test data samples (e.g., samples from machine learning engine 104) and generate histograms. In particular, normalizing engine 106 can generate histograms of the test classification scores generated by a trained test classification model. More particularly, normalizing engine 106 can generate histograms of the test classification scores, where each histogram corresponds to a particular number of tags (i.e., a number of tagged digital training objects utilized to generate the trained test classification model).

For example, normalizing engine 106 can generate histograms that reflect the percentage of test data samples that fall within a particular classification score or range of classification scores. More specifically, normalizing engine 106 can generate histograms, where each histogram corresponds to test classification scores generated using a test classification model trained with a different number of tagged digital training objects (i.e., generated utilizing a different numbers of tags).

In addition, based on the generated histograms, normalizing engine 106 can generate probability functions. In particular, normalizing engine 106 can fit curves to the histograms to generate probability functions. For example, in one or more embodiments, normalizing engine 106 can fit skew-normal curves to generated histograms. Because the histograms correspond to test data samples (i.e., test classification scores) generated utilizing different numbers of tags, normalizing engine 106 can generate probability functions reflecting the probability of classifications scores utilizing different numbers of tags.

Normalizing engine 106 can generate a positive probability function and an imposter probability function. For example, in one or more embodiments, normalizing engine 106 can generate a positive probability function corresponding to classification scores generated from positive digital test images. Similarly, normalizing engine 106 can generate an imposter probability function corresponding to classification scores generated from imposter digital test images.

Upon generating probability functions, in one or more embodiments, normalizing engine 106 can transform classification scores to normalized classification scores. In particular, normalizing engine 106 utilizes the probability functions to transform the classification scores into probabilities that can be more accurately compared to other classification scores.

The normalizing engine 106 can transform classification scores utilizing the probability functions by calculating a variety of probabilities. For instance, in one or more embodiments, the normalizing engine 106 can calculate a probability of generating a particular probability score utilizing a particular number of tags, assuming that an unknown digital object corresponds to a known digital object in tagged digital training images. Similarly, in one or more embodiments, the normalizing engine 106 can calculate a probability of generating a particular probability score utilizing a particular number of tags, assuming that an unknown digital object corresponds to an imposter. Normalizing engine 106 can utilize these probabilities to transform a classification score to a normalized classification score reflecting the probability that an unknown digital object corresponds to a particular classification.

For instance, normalizing engine 106 can receive a classification score corresponding to an unknown digital object. For example, normalizing engine 106 can receive a classification score corresponding to a probe digital image portraying an unknown person. More specifically, normalizing engine 106 can receive a classification score with regard to a probe digital image portraying an unknown person where the normalization score is based on a classification model trained with a particular number of tagged digital training images portraying a known person.

Normalizing engine 106 can identify one or more probability functions corresponding to the number of tagged digital training images (e.g., a positive probability function and an imposter probability function). Moreover, normalizing engine 106 can utilize the received classification score in conjunction with the identified one or more probability functions to generate probabilities corresponding to the unknown person in the probe digital image. Utilizing the one or more probabilities, normalizing engine 106 can generate a normalized classification score.

As mentioned above, and as illustrated in FIG. 1, digital classification system 100 may further include utilization application 110. Utilization application 110 can utilize normalized classification scores. In particular, utilization application 110 can utilize normalized classification scores to identify a classification for a digital object. For example, utilization application 110 can classify an unknown digital object within a probe digital image based on the normalized classification score.

Utilization application 110 can compare one or more normalized classification scores. In particular, utilization application 110 can compare normalized classification scores to determine whether an unknown digital object belongs to a particular classification. For instance, utilization application 110 can receive a probe digital image portraying an unknown person, a first normalized classification score corresponding to a first person, and a second normalized classification score corresponding to a second person. Utilization application 110 can compare the first normalized classification score and the second normalized classification score. Moreover, based on the comparison, utilization application 110 can determine whether the unknown person corresponds to the first person or second person (e.g., by identifying the person corresponding to the highest normalized classification score).

Utilization application 110 can also compare one or more normalized classification scores and determine that an unknown person corresponds to an imposter. For example, utilization application 110 can calculate an imposter normalized classification score that reflects the probability that an unknown person in a probe digital image corresponds to an imposter. Utilization application 110 can compare the imposter normalized classification score with one or more additional normalized classification scores. Moreover, based on the comparison, utilization application 110 can identify whether an unknown person in a probe digital image corresponds to an imposter.

Utilization application 110 can also compare one or more normalized classification scores to a threshold. For instance, utilization application 110 can compare normalized classification scores to a minimum imposter threshold. For example, utilization application 110 can compare a first normalized classification score corresponding to a first person and a second normalized classification score corresponding to a second person with a minimum imposter threshold. In one or more embodiments, if the first and/or second normalized classification scores do not exceed the imposter threshold, utilization application 110 determines that an unknown person in a probe digital image is not the first person or the second person (i.e., the unknown person is an imposter).

Similarly, utilization application 110 can compare an imposter normalized classification score to a maximum imposter threshold. For example, in one or more embodiments if an imposter normalized classification score (e.g., a probability that an unknown person in a probe digital image is an imposter) exceeds a maximum imposter threshold, utilization application 110 determines that an unknown person is an imposter.

It will be appreciated that the normalized classification score makes utilization of an imposter threshold more accurate, reliable, and meaningful. Indeed, given that classification scores can vary based on the number of tags utilized to generate the classification scores, utilization of a threshold without normalized classification scores can result in inaccurate classification of unknown digital objects. For instance, a score generated with regard to a high number of tags will tend to result in a higher classification score and exceed a minimum imposter threshold (even if the unknown digital object is an imposter). Similarly, a score generated with a low number of tags will tend to result in a lower classification score and fail to exceed a minimum imposter threshold (even if the unknown digital object is not an imposter). In sum, a normalized classification score helps to address these problems and enables accurate application of a uniform threshold.

Utilization application 110 can determine an imposter threshold based on a variety of factors or characteristics. For instance, utilization application 110 can determine an imposter threshold based on a particular function, purpose, or utilization. For example, utilization application 110 can determine a less stringent imposter threshold with regard to a classification that will be utilized for an informal search (e.g., to search for a person portrayed in a digital image in a personal image collection). On the other hand, utilization application 110 can determine a more stringent imposter threshold with regard to a formal application that will be shared with others (e.g., grouping digital images to share with others persons based on whether the other persons are portrayed in the digital images).

Similarly, utilization application 110 can determine an imposter threshold based on characteristics or feature of one or more digital objects (e.g., type of digital objects or contents of digital objects). For example, utilization application 110 can determine a higher threshold with regard to classifying a digital object comprising an advertisement with adult content than a digital object comprising an advertisement for a child's toy.

In some embodiments, utilization application 110 determines a risk associated with improper classification and selects an imposter threshold based on the determined risk. For instance, utilization application 110 can determine a higher risk associated with sharing digital objects and utilize more stringent thresholds.

Utilization application 110 can employ normalized classification scores to make a variety of decisions or determinations. For instance, utilization application 110 can utilize normalized classification scores in determining whether to make a recommendation to a user, provide digital content to a user, include digital objects in search results, group digital objects, select digital objects, modify digital objects, or some other action. For example, utilization application 110 can utilize normalized classification scores in determining whether to group digital images together and present the group for display to a user, provide an advertisement for display to a user, provide a social media post to a user, etc.

As the previous exemplary embodiments illustrate, utilization application 110 can apply normalized classification scores with regard to a variety of implementations. For example, as previously mentioned, utilization application 110 can employ normalized application scores to identify unknown objects in digital images. Similarly, utilization application 110 can utilize normalized application scores to search for objects in digital images. In addition to digital images, utilization application 110 can utilize normalized application scores to identify other digital media. For instance, utilization application 110 can utilize normalized application scores with regard to digital video, digital audio, or other digital media. For example, normalizing engine 106 can provide normalized classification scores that indicate a probability that user will add a song to one or more playlists. Moreover, utilization application 110 can utilize the normalized classification scores to determine whether to recommend the song to the user.

Utilization application 110 can utilize normalized application scores with regard to a variety of digital objects in addition to digital media. For instance, utilization application 110 can utilize normalized application scores with regard to social media (e.g., utilize normalization scores to identify a social media post to present to a user). Similarly, utilization application 110 can utilize normalized application scores with regard to targeted advertising (e.g., utilize normalization scores to identify advertisements to present to a user). Utilization application 110 can utilize normalized application scores to select digital files, categorize files into topics or types, or identify other digital object classifications.

As illustrated in FIG. 1, digital classification system 100 can also include storage manager 112. Storage manager 112 maintains data for digital classification system 100. Storage manager 112 can maintain data of any type, size, or kind, as necessary to perform the functions of digital classification system 100.

As shown in FIG. 1, storage manager 112 can include digital object repository 114. Digital object repository 114 can include any collection or group of digital objects. In particular, digital object repository 114 can include a collection of digital images. For example, in one or more embodiments, digital object repository 114 includes a camera roll or gallery of stored digital images (i.e., stored on a client device or remote server).

In addition to digital object repository 114, as illustrated in FIG. 1, storage manager 112 can also include test digital object repository 116. Test digital object repository 116 can also include any collection or group of digital objects. In particular, test digital object repository 116 can include a collection or group of digital objects with known classifications. For instance, in one or more embodiments, test digital object repository 116 includes a collection of digital images where the objects portrayed in the digital images are known. As discussed above, digital classification system 100 (e.g., machine learning engine 104) can utilize test digital object repository 116 to generate test data samples such as test classification scores (e.g., probability data 118).

As just mentioned, and as illustrated in FIG. 1, storage manager 112 can include probability data 118. Probability data 118 includes test data samples (e.g., test classification scores), probability functions, probabilities, or other data utilized by digital classification system 100 to generate a probability of an unknown digital object corresponding to a classification. Probability data 118 can include data in any form. For example, probability data can include a probability function stored in the form of an equation. In addition, or in the alternative, storage manager 112 can include one or more databases that relate probabilities to classification scores.

Moreover, as illustrated in FIG. 1, storage manager 112 can also include tag data 120. Tag data 120 can include one or more tags corresponding to one or more digital objects. In particular, tag data 120 can include identification information with regard to one or more digital objects in a repository of digital objects (e.g., digital object repository 114). For example, tag data 120 can include a tag reflecting user input identifying one or more persons portrayed in a digital image. Similarly, tag data 120 can include tags identified or generated by tag manager 102.

Each of components 102-112 of digital classification system 100 may be in communication with one another using any suitable communication technologies. One will appreciate in light of the disclosure herein that although components 102-112 are shown to be separate in FIG. 1, any of components 102-112 may be combined into fewer components, such as into a single facility or module, or divided into more components as may serve one or more embodiments. In addition, components 102-112 may be located on, or implemented by, one or more computing devices, such as those described below in relation to FIG. 10. Alternatively, portions of digital classification system 100 can be located on a computing device, while other portions of digital classification system 100 may be located on, or form part of, a remote online content management system.

Components 102-112 can comprise software, hardware, or both. For example, components 102-112 can comprise one or more computer-executable instructions stored on a computer readable storage medium and executable by one or more processors of one or more computing devices. When executed by the one or more processors, the one or more computer-executable instructions of digital classification system 100 can cause a computing device(s) to perform the features and methods described herein. Alternatively, components 102-112 can comprise a special purpose processing device to perform a certain function or group of functions. Additionally or alternatively, components 102-112 can comprise a combination of computer-executable instructions and hardware.

Figure 2:
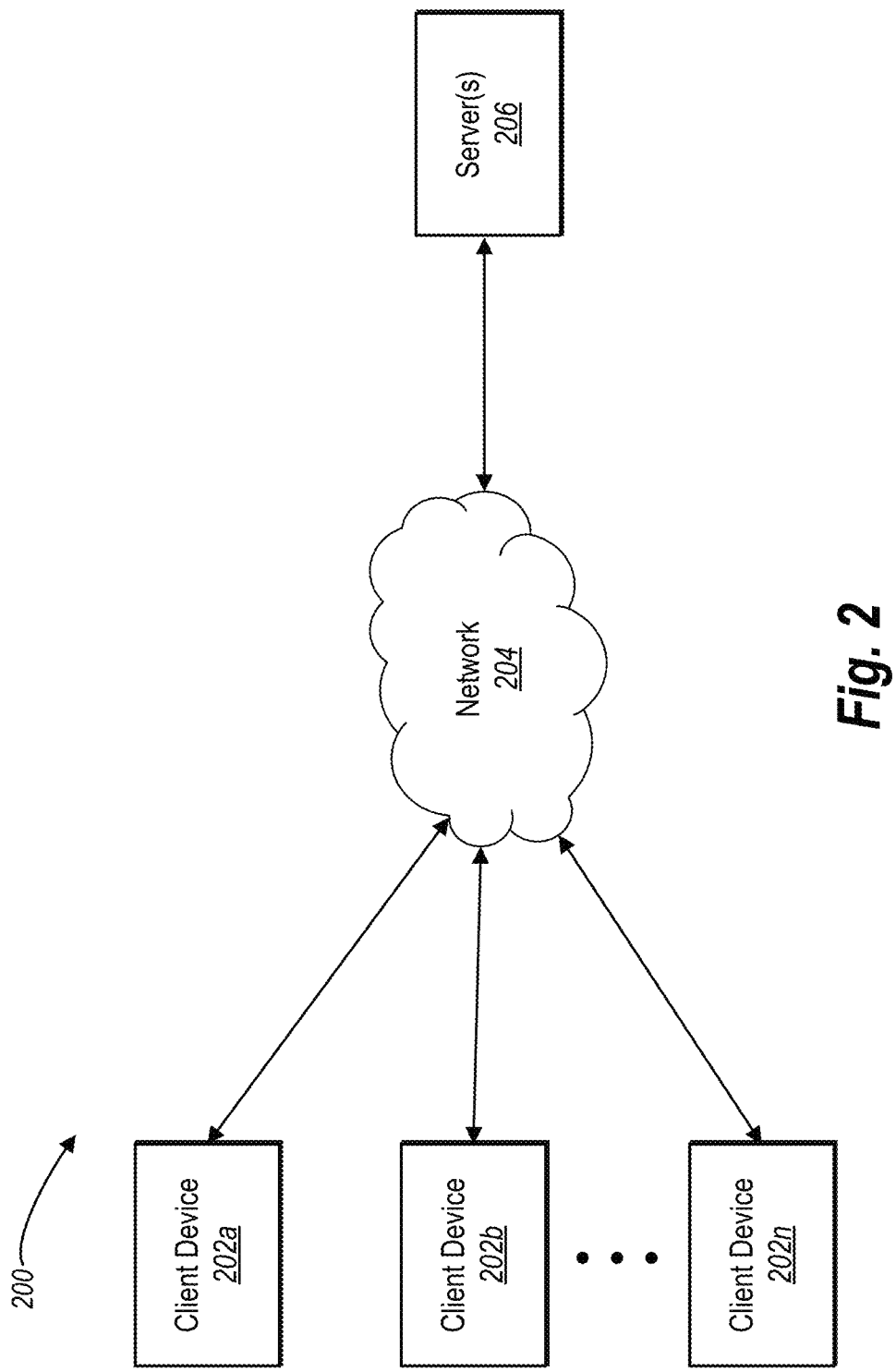
FIG. 2 illustrates a schematic diagram of an environment for implementing the digital classification system in accordance with one or more embodiments.

Turning now to FIG. 2, further information will be provided regarding implementation of digital classification system 100. Specifically, FIG. 2 illustrates a schematic diagram of one embodiment of exemplary system environment ("environment") 200 in which digital classification system 100 can operate. As illustrated in FIG. 2, environment 200 can include client devices 202a-202n, network 204, and server(s) 206. Client devices 202a-202n, network 204, and server(s) 206 may be communicatively coupled with each other either directly or indirectly (e.g., through network 204). Client devices 202a-202n, network 204, and server(s) 206 may communicate using any communication platforms and technologies suitable for transporting data and/or communication signals, including any known communication technologies, devices, media, and protocols supportive of remote data communications, examples of which will be described in more detail below.

As just mentioned, and as illustrated in FIG. 2, environment 200 can include client devices 202a-202n. Client devices 202a-202n may comprise any type of computing device. For example, client devices 202a-202n may comprise one or more personal computers, laptop computers, mobile devices, mobile phones, tablets, special purpose computers, TVs, or other computing devices. In one or more embodiments, client devices 202a-202n may comprise computing devices capable of communicating with each other or server(s) 206. Client devices 202a-202n may comprise one or more computing devices as discussed in greater detail below.

As illustrated in FIG. 2, client devices 202a-202n and/or server(s) 206 may communicate via network 204. Network 204 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, network 204 may be any suitable network over which client devices 202a-202n (or other components) may access server(s) 206 or vice versa. Network 204 will be discussed in more detail below.

Moreover, as illustrated in FIG. 2, environment 200 also includes server(s) 206. Server(s) 206 may generate, store, receive, and/or transmit any type of data, including digital object repository 114, test digital object repository 116, probability data 118, tag data 120, user profiles, user history, or electronic communications. For example, server(s) 206 may receive data from client device 202a and send the data to client device 202b. In addition, server(s) 206 may comprise all or part of a content management system. In one or more embodiments, server(s) 206 may comprise a data server. Server(s) 206 can also comprise a communication server or a web-hosting server. Regardless, server(s) 206 can be configured to send and receive a wide range of digital objects or communications. Additional details regarding server(s) 206 will be discussed below.

Although FIG. 2 illustrates three client devices 202a-202n, it will be appreciated that client devices 202a-202n can represent any number of computing devices (fewer or greater than shown). Similarly, although FIG. 2 illustrates a particular arrangement of client devices 202a-202n, network 204, and server(s) 206, various additional arrangements are possible.

In addition to the elements of environment 200, one or more users can be associated with each of client devices 202a-202n. For example, users may be individuals (i.e., human users). Environment 200 can include a single user or a large number of users, with each of the users interacting with digital classification system 100 through a corresponding number of computing devices. For example, a user can interact with client device 202a for the purpose of selecting, viewing, receiving, and/or sending digital objects (e.g., digital images). The user may interact with client device 202a by way of a user interface on client device 202a. For example, the user can utilize the user interface to cause client device 202a to send a digital object to one or more of the plurality of users of digital classification system 100.

By way of an additional example, in one or more embodiments client device 202a and server(s) 206 collectively contain a collection of digital images associated with a user of client device 202a (e.g., digital object repository 114). In particular, the collection of digital images can comprise images stored on client device 202a (e.g., in a camera roll) and/or digital images stored on server(s) 206 (e.g., in an image gallery stored on a remote server). Client device 202a can receive a plurality of tags (e.g., via tag manager 102) with regard to objects (i.e., known objects) portrayed in the collection of images based on user interaction with client device 202a. Moreover, client device 202a can receive a request to search for additional images portraying the objects (i.e., classify unknown objects). Client device 202a can convey the tags to server(s) 206 (e.g., tag data 120). Server(s) 206 can generate trained classification models (e.g., via machine learning engine 104) by utilizing the known objects, tags, and images as tagged digital training images. Moreover, server(s) 206 can utilize the trained classification models to generate classification scores (e.g., via machine learning engine 104) with regard to one or more images in the collection of digital images and convert the classification scores to normalized classification scores (e.g., via normalizing engine 106). Server(s) 206 can provide the normalization scores to an application on client device 202a and/or on server(s) 206 (e.g., utilization application 110). Moreover, the application can identify images portraying the known objects based on the normalization scores. To the extent the application is implemented on server(s) 206, server(s) 206 can provide identified images to client device 202a. Moreover, client device 202a can provide one or more of the identified images for display to a user of client device 202a via a display device operatively connected to client device 202a.

In addition, in another example embodiment, the server(s) 206 can generate probability functions (e.g., via normalizing engine 106). For example, the server(s) 206 can generate positive probability functions and negative probability functions specific to particular numbers of tags. Moreover, the server(s) 206 can provide the generated probability functions to the client device 202a. The client device 202a and/or the server(s) 206 can then utilize the generated probability functions to convert classification scores generated with regard to probe digital images to normalized classification scores.

As illustrated by the previous example embodiments, components and functionality of digital classification system 100 may be implemented in whole, or in part, by the individual elements 202a-206 of environment 200. Although the previous example, described certain components of digital classification system 100 implemented with regard to certain components of environment 200, it will be appreciated that components of digital classification system 100 can be implemented in any of the components of environment 200. For example, in one or more embodiments, digital classification system 100 can be implemented entirely on client device 202a or server(s) 206. Additionally, or alternatively, in one or more embodiments, machine learning algorithm 104 is implemented on client device 202a (i.e., rather than server(s) 206). Similarly, normalizing engine 106, utilization application 110, and/or digital object repository 114 may be implemented (in whole or in part) on client device 202a. Moreover, in one or more embodiments, tag manager 102 and utilization application 110 may be implemented (in whole or in part) on server(s) 206.

Furthermore, in one or more embodiments, client devices 202a-202n implement various portions of digital classification system 100. For example, each of client devices 202a-202n can contribute digital images to a collection of digital images stored on server(s) 206. Moreover, each of client devices 202a-202n may provide tags (e.g., utilizing tag manager 102) to server(s) 206 with regard to objects portrayed in the collection of digital images. Server(s) 206 can identify various images corresponding to objects portrayed in tagged documents, and provided the identified objects to each of client devices 202a-202n.

Figure 3A:
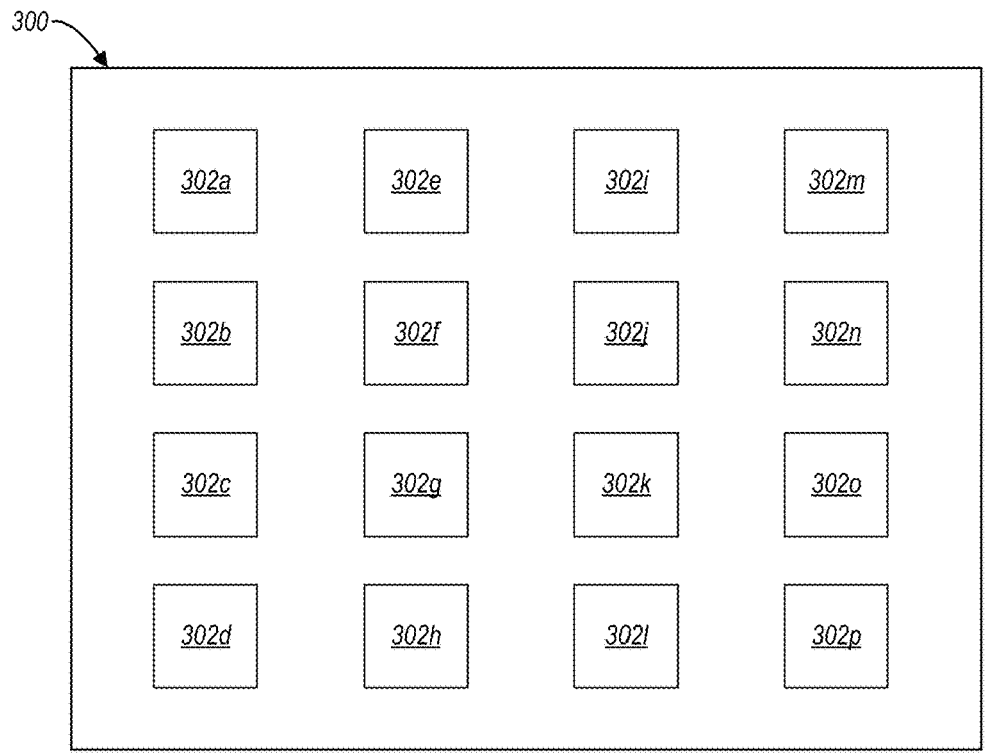
FIG. 3A illustrates a representation of a repository of digital objects in accordance with one or more embodiments.
Figure 3B:
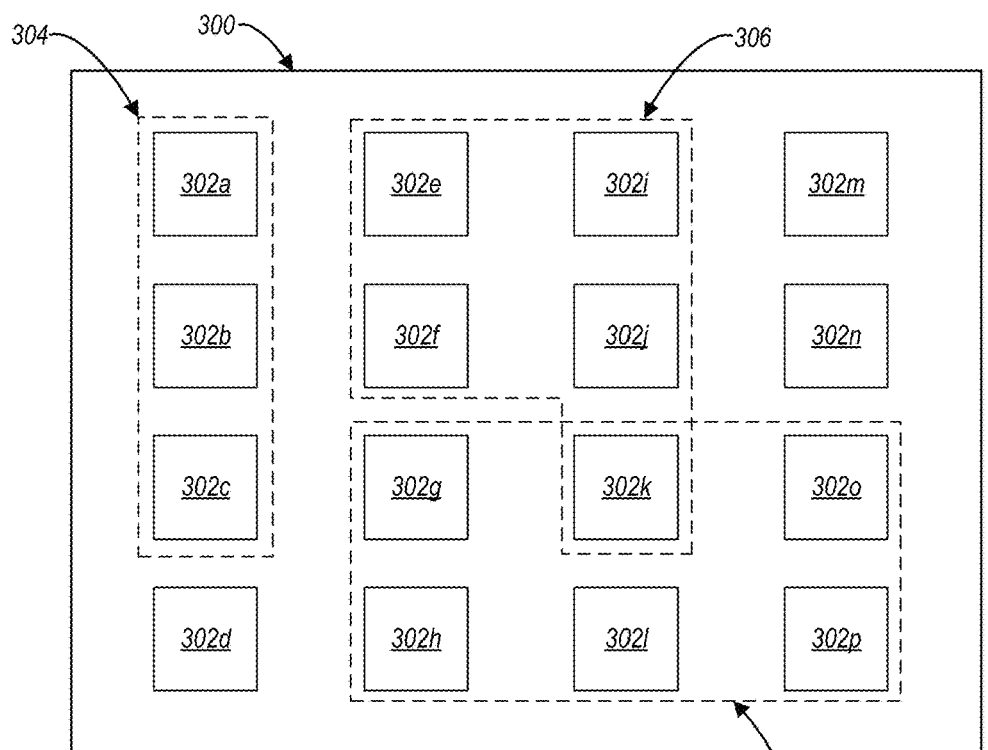
FIG. 3B illustrates a representation of a plurality of sets of tagged digital training objects of the repository of digital objects illustrated in FIG. 3A in accordance with one or more embodiments.

Turning now to FIGS. 3A-3B, additional detail will be provided regarding tags applied to digital objects in accordance with one or more embodiments. In particular, FIG. 3A illustrates a representation of repository 300 containing a plurality of digital images 302a-302p. Repository 300 may comprise any collection of digital images. For example, repository 300 may comprise a gallery of digital images stored on a remote server (e.g., the server(s) 206). Additionally or alternatively, repository 300 may be a camera roll stored on a client device (e.g., the client device 202a). In addition, repository 300 may be a combination of digital images stored both on a client device and a remote server.

It will be appreciated that each of the plurality of digital images 302a-302p portrays one or more objects (e.g., cars, locations, places, things, or persons). As discussed previously, in one or more embodiments, digital classification system 100 classifies one or more of the plurality of digital images 302a-302p based on the objects portrayed in the digital images. In particular, in one or more embodiments, digital classification system 100 classifies one or more of the plurality of digital images 302a-302p based on identified tags.

For example, FIG. 3B illustrates identifying a set of one or more tagged images in accordance with one or more embodiments. In particular, FIG. 3B illustrates repository 300 and the plurality of digital images 302a-302p with first set of tagged images 304, second set of tagged images 306, and third set of tagged images 308.

As discussed above, digital classification system 100 can determine or identify tags in a variety of ways. With regard to FIG. 3B, digital classification system 100 determines tags based on user input identifying sets of tagged images 304-308. In particular, digital classification system 100 identifies first set of tagged items 304 based on user input identifying a first person portrayed within images 302a-302c (e.g., user input indicating that a user's mother is portrayed in digital images 302*a*-302*c*). Similarly, digital classification system 100 identifies second set of tagged items 306 based on user input identifying a second person portrayed within images 302*e*-302*f*, 302*i*-302*k* (e.g., user input indicating that a user's brother is portrayed in digital images 302*e*-302*f*, 302*i*-302*k*). In addition, digital classification system 100 identifies third set of tagged items 308 based on user input identifying a third person portrayed within images 302*g*-302*h*, 302*k*-302*l*, 302*o*-302*p* (e.g., user input indicating that a user's spouse is portrayed in digital images 302*g*-302*h*, 302*k*-302*l*, 302*o*-302*p*).

As illustrated in FIG. 3B, it is possible for individual images to receive multiple tags. For instance, digital image 302*k* belongs to both second set of tagged images 306 and third set of tagged images 308. This is a result of digital image 302*k* portraying both the second person (e.g., the user's brother) and the third person (e.g., the user's spouse).

Notably, each of sets of tagged images 304-308 contains a different number of tagged images. In particular, first set of tagged images 304 contains three tagged images, second set of tagged images 306 contains five tagged images, and third set of tagged images contains six tagged images. As discussed previously, digital classification system 100 can receive any number tagged digital images with regard to a set of tagged digital images. Moreover, digital classification system 100 can account for variations in classification scores that result from variation in the number of tags.

Note also that not all digital images in repository 300 receive tags. For instance, digital images 302*d*, 302*m*, and 302*n* do not receive any tags. In one or more embodiments, digital classification system 100 can determine whether digital images 302*d*, 302*m*, and 302*n* correspond to sets of tagged images 304-308 (e.g., whether digital images 302*d*, 302*m*, or 302*n* portray the user's mother, the user's brother, the user's spouse, or an imposter).

Moreover, although digital images 302*a*-302*c*, 302*e*-302*l*, and 302*o*-302*p* belong to a set of tagged digital images, it will be appreciated that digital classification system 100 can still further classify those digital images. For instance, if digital image 302*a* portrays additional unknown persons (e.g., a group picture with some known and some unknown individuals), digital classification system 100 can classify the unknown persons (e.g., determine whether the unknown persons are the user's brother, the user's spouse, or imposters). Thus, not only can a digital image belong to multiple classifications, digital classification system 100 can also further classify a digital image that already belongs to one or more classifications.

Although repository 300 with regard to the embodiment of FIG. 3A comprises the plurality of digital images 302*a*-302*p*, it will be appreciated that in one or more embodiments, repository 300 may contain any type or variety of digital objects. Moreover, digital classification system 100 can receive tags with regard to any type or variety of digital objects and identify one or more classifications with regard to any type or variety of digital objects.

As mentioned previously, upon identifying tagged digital images, digital classification system 100 can train one or more machine learning algorithms. In particular, digital classification system 100 can train a machine learning algorithm utilizing the tagged digital images (i.e., utilize the tagged digital images as tagged digital training images).

Figure 4A:
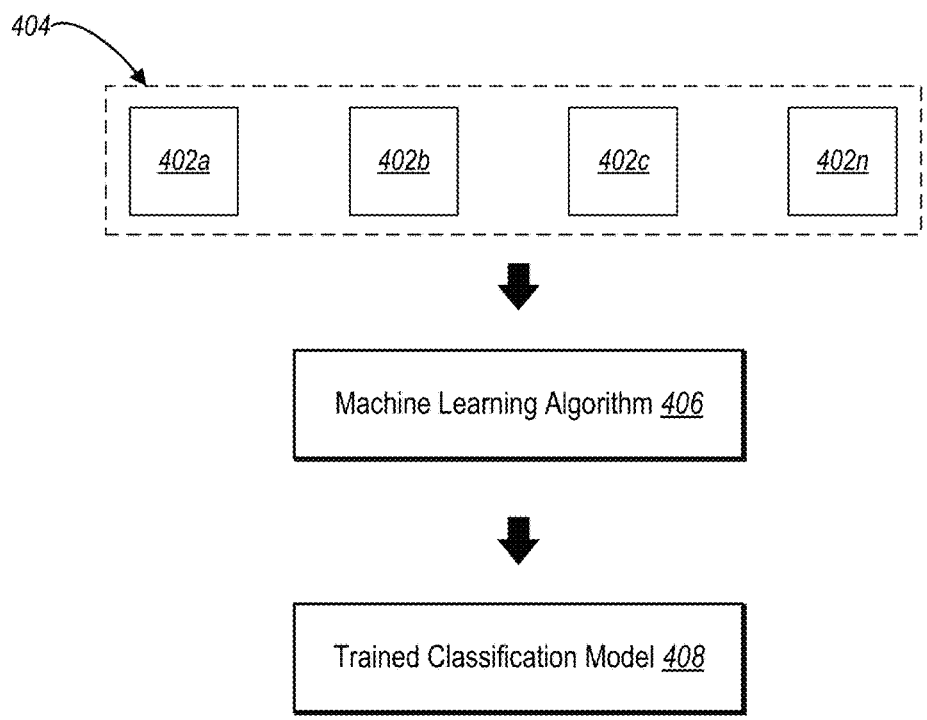
FIG. 4A illustrates a representation of generating a trained classification model based on a set of tagged digital training objects in accordance with one or more embodiments.

For example, FIG. 4A illustrates set of tagged digital training images 404 containing tagged digital training images 402*a*-402*n* (e.g., third set of tagged digital images 308). In particular, each tagged digital training image 402*a*-402*n* portrays a common individual tagged within each digital image. FIG. 4A illustrates digital classification system 100 providing set of tagged digital training images 404 to machine learning algorithm 406. More specifically, digital classification system 100 provides set of tagged digital training images 404 to machine learning algorithm 406 to generate trained classification model 408.

Figure 4B:
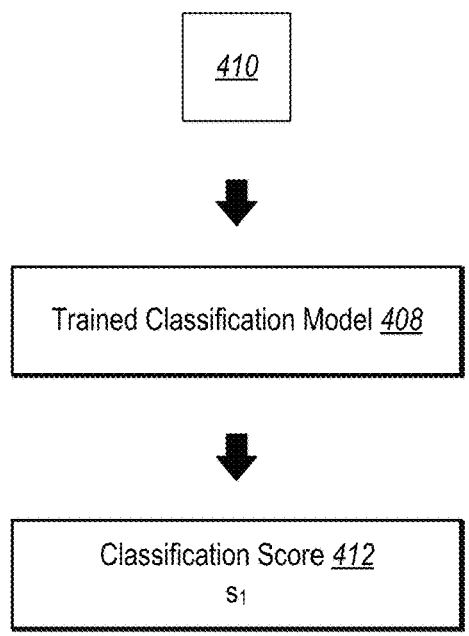
FIG. 4B illustrates a representation of generating classification scores utilizing a trained classification model in accordance with one or more embodiments.

For example, FIG. 4B illustrates probe digital image 410 portraying an unknown object. In one or more embodiments, digital classification system 100 provides probe digital image 410 as input to trained classification model 408. Moreover, trained classification model 408 generates a classification score 412 (i.e., "$s_1$").

As mentioned above, machine learning algorithm 406 can comprise a variety of different types of algorithms. For example, in one or more embodiments machine learning algorithm 406 comprises a support vector machine algorithm. In particular, a support vector machine algorithm is a supervised learning algorithm that builds a trained model based on training examples assigned to two or more classes (e.g., tags). A support vector machine algorithm represents training examples as points in a feature space, and a separator is estimated which divides the feature space in two according the category labels (i.e., tags). New examples (e.g., unknown digital objects) are mapped into the same feature space and predicted (e.g., assigned a classification score) to belong to a particular category based on their location in the space. In this manner, one or more embodiments generate classification scores with regard to one or more unknown digital objects.

In addition to a support vector algorithm, digital classification system 100 can utilize a variety of other machine learning processes. For example, digital classification system 100 can utilize a variety of deep learning algorithms, supervised learning algorithms, clustering algorithms, structured prediction algorithms, anomaly detection algorithms, neural nets, or other algorithms. More specifically, in one or more embodiments digital classification system 100 can utilize decision trees, ensembles, k-NN, neural networks, logistic regression, perceptron, or relevance vector machine algorithms. In one or more embodiments, digital classification system 100 can utilize any machine learning process that generates a classification score to classify unknown digital objects.

It will be appreciated that although FIG. 4A illustrates a single set of tagged digital training images 404, digital classification system 100 can train a machine learning algorithm utilizing a plurality of sets of tagged digital training items. For example, in addition to set of tagged digital training images 404, digital classification system 100 can provide machine learning algorithm 406 a second set of tagged digital training images corresponding to a second person portrayed in the second set of tagged digital training images. Thus, digital classification system 100 can generate trained classification model 408 such that trained classification model 408 can classify (e.g., generate classification scores) unknown digital objects with regard to both the person portrayed in set of digital training images 404 and the second set of digital training images. Alternatively, digital classification system 100 can generate a separate trained classification model that can classify unknown digital objects (e.g., generate classification scores) with regard to the second person portrayed in the second set of digital training images only.

Similarly, although FIG. 4B illustrates a single classification score generated by trained classification model 408, it will be appreciated that trained classification model 408 can generate a plurality of classification scores. In particular, in one or more embodiments, trained classification model 408 generates a classification score for any classification it is trained to identify. For example, in one or more embodiments, trained classification model 408 generates a classification score for each set of tagged digital training images (e.g., for each person tagged in a repository of digital images). Thus, if digital classification system 100 provides two sets of tagged digital training images (e.g., two sets of digital images identifying two persons), trained classification model 408 can generate two classification scores (e.g., one classification score indicating the likelihood that the unknown person in digital image 410 corresponds to the first known person and another classification score indicating the likelihood that the unknown person in digital image 410 corresponds to the second known person).

As discussed previously, however, in some circumstances generated classification scores may not be calibrated for meaningful comparison. In particular, the magnitude of a classification score may not be comparable to the magnitude of a second classification score. For example, trained classification model 408 may generate a first classification score of 0.6 with regard to a first possible classification of an unknown digital object and a second classification score of 0.5 with regard to a second classification of an unknown digital object. If digital classification system 100 compared the first classification score (0.6) and the second classification score (0.5) directly, it may conclude that the unknown digital object corresponds to the first classification.

However, the first classification score and the second classification score may not be calibrated for direct comparison. In particular, digital classification system 100 accounts for newly discovered variation in classification scores that results from differences in the number of tags utilized to generate a trained classification model with regard to a particular classification. In other words, the difference in the first classification score (0.6) and the second classification score (0.5) may result from a difference in the number of tags utilized to train the classification model. Thus, the unknown digital image may actually have a higher probability of belonging to the second classification than the first classification, despite the relative magnitude of the classifications scores. Accordingly, direct comparison of classification scores can result in inaccurate classifications.

Similarly, application of a threshold with regard to raw classification scores can result in further errors. For instance, if digital classification system 100 applies a threshold with regard to the first classification score (0.6) and the second classification score (0.5), digital classification system 100 may inappropriately filter out the first and/or second classification scores. For example, applying a minimum threshold filter of 0.55 would cause digital classification system 100 to conclude that the second classification score (0.5) corresponds to an imposter. This would result despite the fact that the second classification score may only fall below the threshold as a result of the number of tags utilized to generate the score (i.e., rather than a low probability that the unknown digital object corresponds to the second classification).

Accordingly, as mentioned previously, digital classification system 100 generates normalized classification scores. In particular, digital classification system 100 generates normalized classification scores by generating probabilities corresponding to classification scores with regard to the number of tags. More specifically, digital classification system 100 generates probability functions utilizing digital test images and test classification models.

Figure 5:
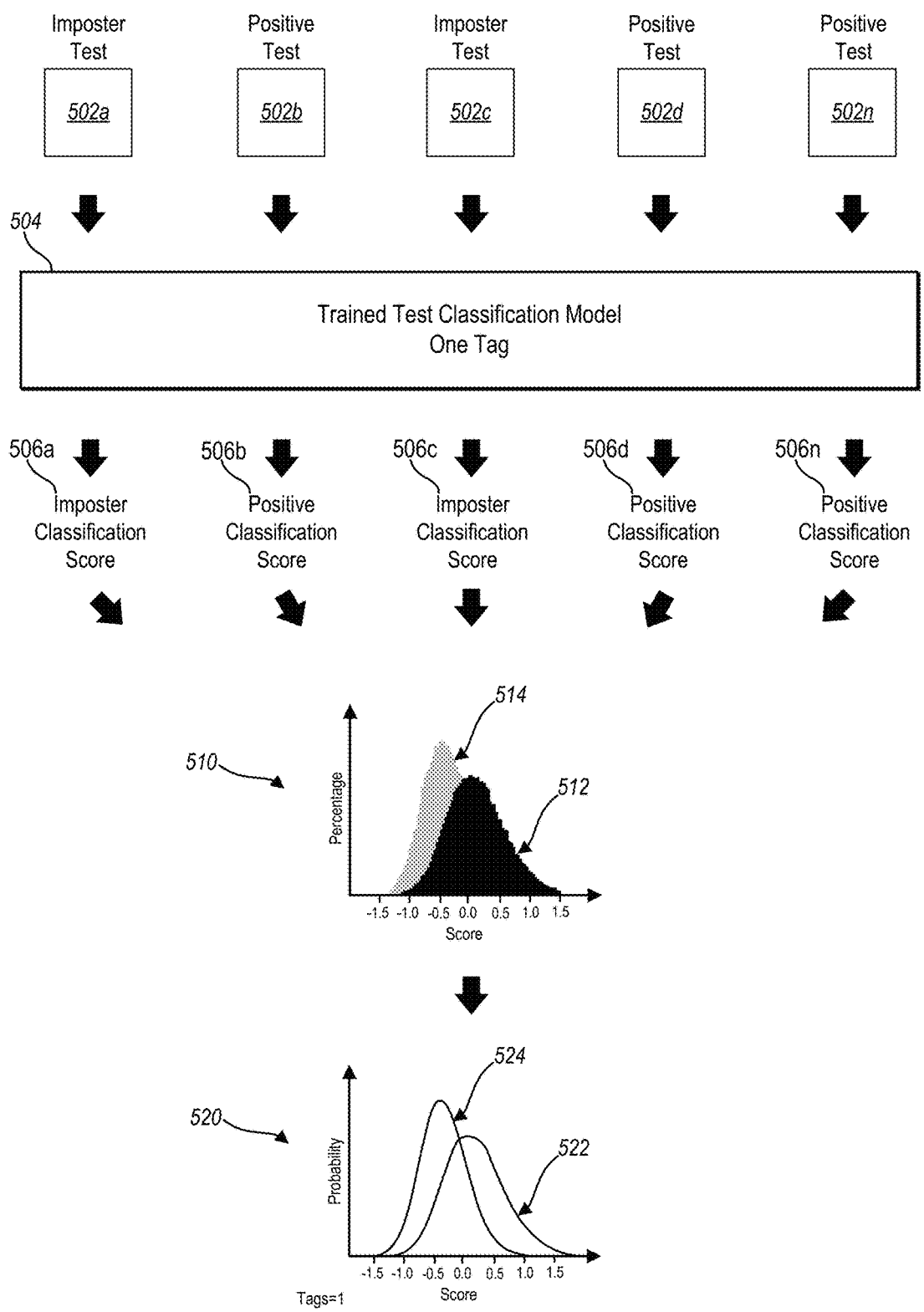
FIG. 5 illustrates generating a probability function particular to a number of tags based on a repository of digital test objects in accordance with one or more embodiments.

For example, FIG. 5 illustrates digital classification system 100 providing digital test images 502a-502n to trained test classification model 504. Specifically, digital classification system 100 generates trained test classification model 504 utilizing one tagged digital test image from a repository of digital test images. FIG. 5 illustrates that trained test classification model 504 generates test classification scores 506a-506n corresponding to each digital test image 502a-502n. Moreover, digital classification system 100 utilizes test classification scores 506a-506n as test data points to build tag-specific histograms 510. Furthermore, from tag-specific histograms 510, digital classification system 100 generates tag-specific probability functions 520.

As illustrated in FIG. 5, digital classification system 100 can generate probability functions based on digital test images 502a-502n. In particular, digital test images 502a-502n comprise digital images portraying known test objects. Specifically, digital test images 502a-502n are either imposter test images (i.e., images portraying objects that do not correspond to tagged training objects utilized to generate the trained test classification model 504) or positive test images (i.e., images portraying objects corresponding to tagged training objects). For example, as illustrated, digital test image 502a is an imposter digital test image.

Although FIG. 5 illustrates each digital test image 502a-502n as comprising an imposter digital test image or a positive digital test image, it will be appreciated that digital test images 502a-502n can comprise both imposter digital test images and positive digital test images. For instance, digital classification system 100 can utilize a digital test image portraying two persons (e.g., a first person corresponding to a tagged person and a second person that is an imposter). Thus, the test digital image can comprise both an imposter digital test image (i.e., with regard to the imposter portrayed in the digital image) and a positive digital test image (i.e., with regard to the person corresponding to the tagged person). Moreover, digital classification system 100 can generate two classification scores with regard to the digital test image (e.g., an imposter classification score and a positive classification score).

Digital classifications system 100 can obtain digital test images 502a-502n from a variety of sources. With regard to the embodiment of FIG. 5, digital classification system 100 obtains digital test images 502a-502n from a repository of digital test objects (e.g., the test digital object repository 116).

As illustrated in FIG. 5, digital classification system 100 provides digital test images 502a-502n to trained test classification model 504. In particular, trained test classification model 504 is a model generated utilizing a machine learning algorithm (as described previously). Specifically, digital classification system 100 generates the trained test classification model 504 by providing a machine learning algorithm with a training set containing a single tagged digital image. For example, digital classification system 100 can generate the trained test classification model 504 by providing a machine learning algorithm with an image portraying a tagged person (e.g., a person identified as the user's mother).

As illustrated, based on digital test images 502a-502n, trained test classification model 504 generates one or more classification scores. In particular, trained test classification model 504 generates test classifications scores 506a-506n. Test classification scores 506a-506n correspond to test digital images 502a-502n provided to trained test classification model 504. For instance, in one or more embodiments, trained test classification model 504 generates a test classification score with regard to each digital test image provided to trained test classification model 504. Thus, for example, test classification score 506a corresponds to digital test image 502a.

Furthermore, as illustrated, digital classification system 100 can identify test classification scores based on the corresponding digital test image. Specifically, given that digital test images 502a-502n portray known objects, digital classification system 100 can identify test classification scores based on the known objects. Accordingly, as illustrated in FIG. 5, digital classification system 100 identifies each test classification score 506a-506n as either an imposter classification score (e.g., a classification score corresponding to an imposter digital test image) or a positive classification score (e.g., a classification score corresponding to a positive digital test image). For example, digital classification system 100 identifies test classification score 506a as an imposter classification score, because test classification score 506a corresponds to imposter digital test image 502a.

Upon generating a plurality of test classification scores, in one or more embodiments, digital classification system 100 generates one or more histograms. In particular, digital classification system 100 utilizes the test classification scores as test data samples to generate a histogram of test classification scores. For instance, as illustrated in FIG. 5, digital classification system 100 generates tag-specific histograms 510. More specifically, digital classification system 100 generates positive histogram 512 and imposter histogram 514.

Digital classification system 100 generates tag-specific histograms 510 utilizing test classification scores 506a-506n. In particular, digital classification system 100 determines the value of each test classification score 506a-506n and determines the number of test classification scores that correspond to a particular value (or range of values). Thus, for example, digital classification system 100 determines the number of test classification scores that have a value of 1.0 (or fall within the range of 1.0 to 1.1). Digital classification system 100 can then chart the number of test classification scores that have the value of 1.0 together with the number of test classification scores that correspond to other values (e.g., the number of classification scores that have a value of 0, −1, etc.).

Moreover, in one or more embodiments, digital classification system 100 converts the number of test classification scores corresponding to a particular value to a percentage (i.e., by dividing by the total number of test classification scores). Thus, rather than utilizing the number of test classification scores that correspond to a value of 1.0, in one or more embodiments, digital classification system 100 determines the percentage of test classification scores that correspond to 1.0. For example, in FIG. 5, digital classification system 100 has generated the tag-specific histograms 100 as a percentage.

As mentioned previously, digital classification system 100 trains test classification model 504 utilizing a single tagged digital training image. Accordingly, tag-specific histograms 510 reflect test classification scores generated based on a single tag. Thus, tag-specific histograms 510 provide percentages of test classifications scores that result from utilizing a single tag.

Moreover, as shown, digital classification system 100 generates positive histogram 512 and imposter histogram 514. Digital classification system 100 generates positive histogram 512 utilizing positive test classification scores (i.e., 506b, 506d, and 506n). Similarly, digital classification system 100 generates imposter histogram 514 utilizing imposter test classifications scores (i.e., 506a, 506c).

As just mentioned, positive histogram 512 and imposter histogram 514 reflect percentages of test classification scores based on a single tag. Thus, positive histogram 512 reflects percentages of test classification scores that result in a positive classification (i.e., where the unknown object corresponds to the known, tagged object) when utilizing a test classification model trained utilizing a single tag. Similarly, imposter histogram 514 reflects percentages of test classifications scores that result in an imposter (i.e., where the unknown object does not correspond to the known, tagged object) when utilizing a test classification model trained utilizing a single tag.

In one or more embodiments, digital classification system 100 generates a probability function based on a histogram. For example, as shown in FIG. 5, digital classification system 100 generates tag-specific probability functions 520 from tag-specific histograms 510. In particular, digital classification system 100 generates tag-specific probability functions 520 by generating a best-fit curve to tag-specific histograms 510.

Digital classification system 100 can fit any variety of functions to data points reflected in a histogram. For instance, in one or more embodiments, digital classification system 100 fits a skew-normal function to a histogram. In other embodiments, digital classification system 100 utilizes beta, gamma, normal, or other distribution functions.

As illustrated in FIG. 5, digital classification system 100 generates positive probability function 522 and imposter probability function 524. In particular, digital classification system 100 generates positive probability function 522 based on positive histogram 512 and imposter probability function 524 based on imposter histogram 514.

Because tag-specific probability functions 520 are generated from tag-specific histograms 510, tag-specific probability functions 520 reflect a probability based on a test classification model trained with a single tag. Thus, positive probability function 522 reflects the probability of returning classification scores based on a classification model trained utilizing a single tag, assuming that an unknown person in a probe digital image corresponds to a known, tagged person in tagged digital training image. Similarly, imposter probability function 524 reflects the probability of returning classification scores based on a classification model trained utilizing a single tag, assuming that an unknown person in a probe digital image is an imposter.

Figure 6:
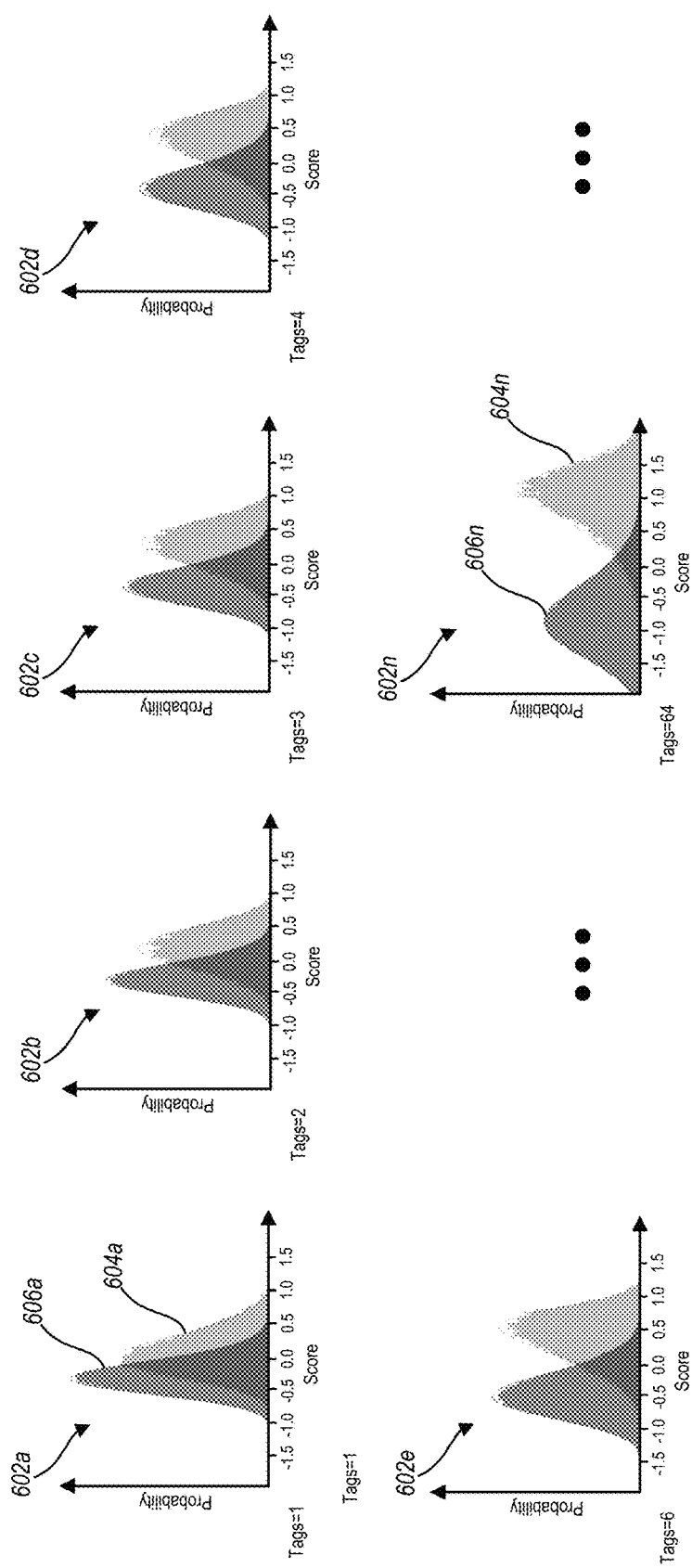
FIG. 6 illustrates a representation of a plurality of probability functions, each probability function specific to a number of tags in accordance with one or more embodiments.

Although FIG. 5 illustrates tag-specific probability functions 520 generated utilizing test classification model 540 trained utilizing a single tag, digital classification system 100 can generate tag-specific probability functions reflecting any number of tags. For example, FIG. 6 illustrates a plurality of tag-specific probability functions 602a-602n, each of tag-specific probability functions 602a-602n reflecting a different number of tags.

For example, tag-specific probability functions 602a reflect probability functions generated utilizing a single tag (e.g., the same probability function as tag-specific probability functions 520). Similarly, tag-specific probability functions 602n reflect probability functions generated utilizing sixty-four tags. In particular, tag-specific probability functions 602n reflect probability functions generated from a test classification model trained utilizing sixty-four tagged digital training images portraying a particular known object (e.g., sixty-four tagged digital images portraying the same tagged person).

Although the previous example embodiments describe generating test classification scores 506a-506n, histograms 512-514, and tag-specific probability functions 602a-602n by utilizing a plurality of digital test images portraying a single known object, it will be appreciated that in one or more embodiments, digital classification system 100 can utilize a plurality of digital test images portraying different known objects to generate classification scores, histograms and tag-specific probability functions. Indeed, in one or more embodiments, digital classification system 100 generates probability functions utilizing different known objects so that the resulting probability functions are not biased to the particular characteristics or features of a single known object.

Thus, for example, digital classification system 100 can build tag-specific probability functions from a plurality of digital images portraying more than one known person. Specifically, digital classification system 100 can generate tag-specific probability functions 602a-602n for each known person in a repository of digital images and average the tag-specific probability functions together. In this manner, digital classification system 100 can generate tag-specific probability functions 602a-602n that are not specific to a particular person.

For example, consider a person A portrayed in 100 images in a repository of digital images. Digital classification system 100 can generate a probability function for person A specific to 25 tags by randomly selecting 25 images from the repository of digital images and then training a test classification model with the 25 images (e.g., as described with regard to FIG. 5). Moreover, digital classification system 100 can utilize the remaining 75 images portraying person A (from the 100 digital images portraying person A) to generate a positive histogram (as described with regard to FIG. 5). In addition, digital classification system 100 can utilize imposter images within the trained test classification model to generate a negative histogram (as described with regard to FIG. 5).

However, there may be unique characteristics regarding person A, or the selected digital images portraying person A, that could make a resulting histogram (or probability function) generated with regard to person A skewed or biased. For example, it is possible that person A has unique features that make person A particularly easy to recognize. Similarly, the images of person A may happen to portray similar circumstances, thus skewing the results to these circumstances. Accordingly, in one or more embodiments, digital classification system 100 repeats the process of sampling digital images, training a test classification model, and generating test classification scores for person A (e.g., to reduce the probability that the random selection of images portraying person A are biased). Moreover, in one or more embodiments, the digital classification model repeats the process of sampling digital images, training a test classification model, and generating test classification scores for other persons represented in the repository of digital images.

Thus, for example, digital classification system 100 can randomly select a second set of 25 images of person A, train a second test classification model utilizing the second set of 25 images of person A, and generate a second set of 75 test classification scores. Digital classification system 100 can add the second set of 75 classification scores to the positive histogram created with the first set of 75 classification scores. Moreover, digital classification system 100 can generate a second set of imposter classification scores and add the second set of imposter classification scores to the imposter histogram created with the first set of imposter classification scores. Digital classification system 100 can repeat this process, for example, ten times, generating ten sets of 75 classification scores with regard to ten different trained classification models for person A (creating 75×10=750 classification scores with regard to the positive histogram).

The digital classification score can also repeat this process with regard to other persons portrayed in the repository of digital images. For example, the digital classification score can identify a set of 100 digital images portraying person B. Digital classification system 100 can sample 25 digital images (i.e., 25 tags) and generate a trained classification model with regard to person B utilizing the 25 digital images. Digital classification system 100 can then utilize the 75 remaining images of person B to generate 75 test classification scores. Digital classification system 100 can then add these 75 test classification scores applicable to person B to the histogram of test classification scores generated with regard to person A. Digital classification system 100 can also repeat this process with regard to person B ten times (thus, generating 10×75=750 test classification scores with regard to person B).

The digital classification score can repeat this process with regard to any number of people portrayed in a repository of digital images. For example, if a repository of digital images portrays 200 different individuals (each individual portrayed in 100 digital images), digital classification system 100 can repeatedly sample images and generate test classifications for each of the 200 different individuals. For example, by generating 750 test classification scores for each person, as described above with regard to person A and person B, digital classification system 100 can generate 750×200=150,000 test classification scores. Similarly, digital classification system 100 can generate any number of imposter scores by providing imposter images to each trained test classification model.

Digital classification system 100 can then utilize the resulting positive test classification scores to generate a positive histogram (e.g., similar to positive histogram 512). Moreover, digital classification system 100 can utilize the resulting imposter test classification scores to generate an imposter histogram (e.g., similar to imposter histogram 514). The resulting positive histogram and imposter histogram reflect classification scores from 200 different individuals, avoiding bias that may result from utilizing a single individual. In this manner, digital classification system 100 can generate a positive histogram for classification models trained using 25 tags from digital images portraying a variety of different individuals. In addition, digital classification system 100 can generate an imposter histogram for classification models trained using 25 tags from digital images portraying a variety of different individuals.

Moreover, as described above, digital classification system 100 can also generate a positive probability function (e.g., similar to positive probability function 522) and an imposter probability function (e.g., similar to imposter probability function 524) for classification models trained using 25 tags based on the generated positive histogram and the generated imposter histogram reflecting 25 tags. In particular, digital classification system 100 can generate a positive probability function and a negative probability function specific to 25 tags by fitting curves to the generated histograms.

Notably, by utilizing a plurality of persons and a plurality of random draws with regard to each person, digital classification system 100 can generate probability functions that are not person-specific and that reduce the risk of bias with regard to the unique characteristics or features of a particular individual or random sampling.

It will be appreciated that although the previous examples were described with regard to 25 tags (e.g., 25 digital training images for each trained classification model), digital classification system 100 can generate probability functions with regard to any number of tags. For example, upon creating probability functions with regard to 25 tags, digital classification system 100 can repeat the process described above and generate probability functions with regard to 1, 2, 3, or any other number of tags. Thus, digital classification system 100 can generate probability functions 602a-602n illustrated in FIG. 6 based on a plurality of individuals portrayed in a repository of digital images.

Similarly, although the previous examples were described with regard to a certain number of images, individuals, test scores, or repetitions (e.g., 200 individuals, 100 images per person, 75 test classification scores, and ten repetitions per person), it will be appreciated that the particular number of images, individuals, test scores, or repetitions can change from embodiment to embodiment. Thus, the digital collection system can utilize a different number of persons portrayed in a different number of digital images, producing a different number of test scores. Moreover, the digital collection system can repeat the process of sampling, training a test classification model, and generating classification scores a different number of times with regard to each individual.

Notably, as illustrated in FIG. 6, as the number of tags increase, the shape and location of the tag-specific probability functions changes. For example, as the number of tags increases, positive probability functions tend to separate horizontally from imposter probability functions. Specifically, with regard to tag-specific probability functions 602a, positive probability function 604a overlaps imposter probability function 606a by a relatively large amount. However, with regard to tag-specific probability functions 602n, which reflects sixty-four tags, positive probability function 604n overlaps significantly less with imposter probability function 606n. This indicates that the larger the number of tags, the greater the ability to distinguish between imposters and positive classifications.

Also notable, however, is that the tag-specific probability functions also tend to horizontally drift as the number of tags increases. In particular, the tag-specific probability functions tend to move to the right as the number of tags increases. For example, consider a classification score of 0.5 with regard to tag-specific probability functions 602a (generated with a single tag). A classification score of 0.5 corresponds to a miniscule probability with regard to the imposter probability function 606a and a much more significant probability with regard to the positive probability function 604a. This indicates that a classification score of 0.5 indicates a very small likelihood that an unknown object is an imposter with regard to a classification model trained with a single tag. Consider, however, a classification score of 0.5 with regard to tag-specific probability functions 602n (generated with sixty-four tags). A probability score of 0.5 corresponds to a higher probability from the imposter probability function 606n than from the imposter probability function 606a. Similarly, a classification score of 0.5 returns a lower probability with regard to the positive probability function 604n than with regard to the positive probability function 604a. Thus, the same classification score reflects different probabilities with regard to the likelihood that an unknown object belongs to a particular classification or is an imposter.

This example illustrates the newly-discovered problem with regard to classification scores. In particular, raw classification scores are often not comparable. For example, as just discussed, a classification score of 0.5 reflects different probabilities of returning imposters or positive classifications depending on the number of tags utilized to train the classification model. Furthermore, because the classification scores are not calibrated for meaningful comparison, selecting a classification by comparing classification scores can lead to inaccurate results.

FIG. 6 also illustrates how utilizing a threshold with regard to classification scores can lead to inaccurate results. In particular, if digital classification system 100 utilized a minimum imposter threshold of 1.0 with regard to non-normalized classification scores, it would disproportionately identify imposters with regard to classification scores resulting from a small number of tags. Indeed, if digital classification system 100 utilized a minimum threshold of 1.0, most digital objects corresponding to a single tag would be classified as imposters upon application of the threshold. Indeed, as shown by the positive probability function 604a, the probability of returning a classification score above 1.0 with a single tag is almost zero. This despite the fact that the imposter probability function 606a shows that there is very little risk of an imposter for any classification score above 0.5. In comparison, positive classification score 604n illustrates that a significant probability exists that digital classification system 100 will return a classification score above 1.0. Thus, a threshold applied to non-normalized classification scores can result in disproportionality mis-classifying digital objects with a low number of tags.

Notably, as mentioned previously, adding additional tags does not necessarily alleviate the problem resulting from utilizing raw classification scores. For example, in a circumstance where a training classification model has received a single tag with regard to a first classification and sixty-four classifications with regard to a second classification, adding additional tags corresponding to the second classification further exacerbates the problem. In particular, classification scores with regard to the first classification become even loss comparable to the second classification. Thus, failing to account for variation in comparing classification scores can result in the counter-intuitive result of receiving less accurate results upon providing additional information to a machine learning algorithm.

In one or more embodiments, digital classification system 100 addresses this newly-discovered issue by generating normalized classification scores. In particular, in one or more embodiments, digital classifications system 100 generates normalized classification scores that account for variability in raw classification scores corresponding to a number of tags. For instance, digital classification system 100 can generate normalized classification scores based on probability functions reflecting the number of tags.

Figure 7:
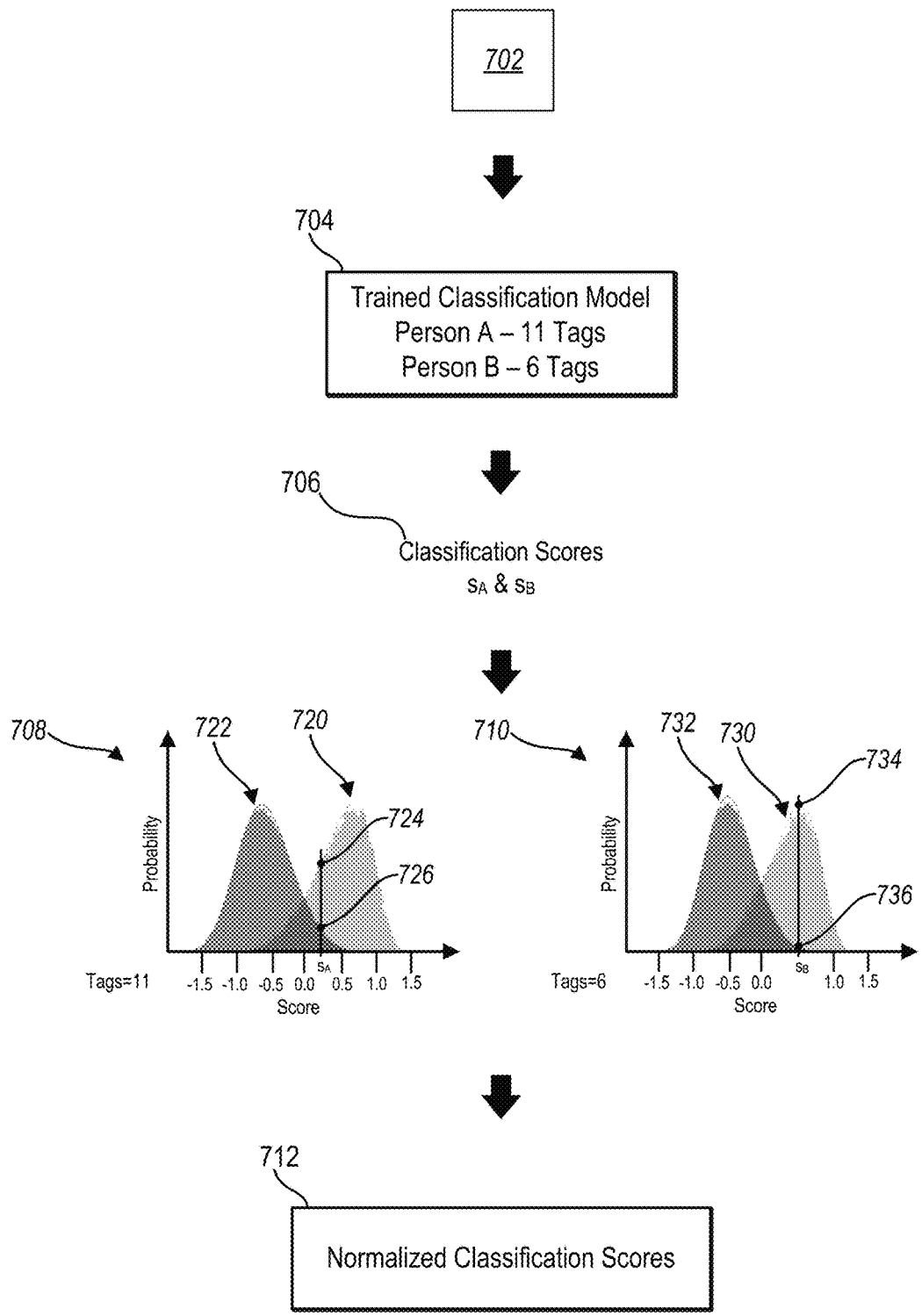
FIG. 7 illustrates a representation of generating normalized classification scores in accordance with one or more embodiments.

For example, FIG. 7 illustrates generating normalized classification scores in accordance with one or more embodiments. In particular FIG. 7, illustrates generating normalized classification scores with regard to an unknown person portrayed in digital image 702. Specifically, FIG. 7 illustrates digital classification system 100 providing digital image 702 portraying the unknown person to trained classification model 704. As shown, digital classification system 100 generates trained classification model 704 utilizing eleven tagged digital training images portraying person A and six tagged digital training images portraying person B. Moreover, as illustrated, digital classification system 100 utilizes trained classification model 704 to generate classification scores 706, comprising scores $s_A$ and $s_B$. FIG. 7 illustrates digital classification system 100 identifying tag-specific probability functions corresponding to eleven tags 708 and tag-specific probability functions corresponding to six tags 710. Moreover, digital classification system 100 identifies probabilities corresponding to classification scores 706 utilizing tag-specific probability functions 708, 710. Moreover, as shown, digital classification system 100 utilizes tag-specific probability functions 708, 710 to generate normalized classification scores 712.

As discussed previously, digital classification system 100 can access probe digital image 702 from a repository of digital images (e.g., a gallery of digital images stored on a remote server). For example, digital classification system 100 can receive a request to search unknown persons portrayed in a repository of probe digital images, and digital classification system can identify probe digital image 702 as an object portraying an unknown person.

Moreover, as mentioned previously, digital classification system 100 can generate a trained classification model to identify unknown digital objects. In particular, digital classification system 100 can generate a trained classification model by providing a machine learning algorithm with a set of tagged digital training images. For example, with regard to FIG. 7, digital classification system 100 generates the trained classification model 704 by providing a machine learning algorithm with tagged digital training images portraying Person A and Person B. More specifically, digital classification system 100 generates trained classification model 704 by providing a machine learning algorithm with eleven tagged digital training images portraying Person A (i.e., Person A identified in eleven digital images) and six tagged digital training images portraying Person B (i.e., Person B identified in six digital images). Accordingly, digital classification system 100 generates trained classification model 704 to classify unknown persons with regard to Person A or Person B.

As shown in FIG. 7, utilizing trained classification model 704, digital classification system 100 generates classification scores 706. In particular, trained classification model 704 generates scores $s_A$ and $s_B$. Scores $s_A$ and $s_B$ correspond to Person A and Person B, and respectively reflect a likelihood that the unknown person in probe digital image 702 corresponds to Person A and Person B. However, as mentioned previously, because digital classification system 100 generates score $s_A$ and $s_B$ utilizing a different number of tags, scores $s_A$ and $s_B$ may not be accurately comparable. Accordingly, digital classification system 100 generates normalized classification scores 712 utilizing tag-specific probability functions 708, 710.

For instance, in one or more embodiments, digital classification system 100 generates normalized classification scores reflecting the probability of a known, tagged object corresponding to an unknown object. In particular, in one or more embodiments, digital classification system 100 calculates the probability of a known, tagged object corresponding to an unknown object in light of one or more probability scores. Similarly, in one or more embodiments, digital classification system 100 calculates the probability of an unknown object corresponding to an imposter in light of one or more probability scores. Moreover, digital classification system can utilize probabilities to generate normalization scores.

For example, consider an example embodiment attempting to classify an unknown Person X in a probe digital image. Given unknown Person X in a probe digital image, and known persons A, B, C . . . N (i.e., persons identified in tagged digital training images), digital classification system 100 can calculate the probability, P(A|X). In other words, digital classification system 100 can calculate the probability that Person A is Person X in the probe digital image, given information regarding unknown Person X in the probe digital image.

In particular, digital classification system 100 assumes that information about Person X is captured by classification scores, $s=s_A, \ldots, s_N$ resulting from a trained classification model trained based on tagged training images of persons A, B, C . . . N. Accordingly, application of Bayes' rule results in the following:

$$P(A \mid s) = \frac{p(s \mid A)P(A)}{p(s)}$$

where P(A|s) reflects the probability of Person A corresponding to Person X in the probe digital image given classification scores s; where p(s|A) reflects the probability of classification scores s assuming Person A corresponds to Person X in the probe digital image; where P(A) reflects the prior probability that Person A corresponds to Person X in the probe digital image; and where p(s) reflects the probability of classification scores s.

Moreover, assuming that the classification scores are independent, the following equation results:

$$P(A \mid s) = \frac{\left(\prod_{i=1}^{N} p(s_i \mid A)\right) P(A)}{p(s)}$$

In addition, bringing the positive likelihood out of the product yields:

$$P(A \mid X) = \frac{p(s_A \mid A) \left(\prod_{i \neq A} p(s_i \mid A)\right) P(A)}{p(s)}$$

Utilizing a similar approach, digital classification system 100 can also calculate the probability, P(I|X) (i.e., the probability that Person X in the probe digital image is an imposter that does not correspond to Persons A, B, C . . . N, given information regarding unknown Person X in the probe digital image). In particular:

$$P(I \mid X) = \frac{\left(\prod_{i=1}^{N} p(s_i \mid I)\right) P(I)}{p(s)}$$

In one or more embodiments, digital classification system 100 utilizes one or more probability functions to calculate P(A|X) and/or P(I|X). In particular, in one or more embodiments, digital classification system 100 estimates $p(s_A|A)$ (i.e., the probability of obtaining classification score $s_A$ assuming that Person A corresponds to Person X in the probe digital image) and $p(s_i|A)$ where i is not A (i.e., the probability of obtaining imposter classification score $s_i$ assuming that Person A corresponds to Person X in the probe digital image) utilizing one or more probability functions. More specifically, digital classification system 100 can estimate $p(s_A|A)$ utilizing $f_{k_A}^+(s_A)$, where $f_{k_A}^+(s_A)$ is the value of a positive probability function at score value $s_A$; where the positive probability function is generated based on $k_A$ tags; and where $k_A$ corresponds to the number of tagged training images portraying Person A. Similarly, digital classification system 100 can estimate $p(s_i|A)$ (i.e., where i is not A) utilizing $f_{k_i}^-(s_i)$, where $f_{k_i}^-(s_i)$ is the value of an imposter probability function at value $s_i$; where the imposter probability function is generated based on $k_i$ tags; and where $k_i$ corresponds to the number of tagged training images portraying Person i.

As described previously (with regard to FIGS. 5 and 6), in one or more embodiments, digital classification system 100 utilizes a positive probability function and imposter probability function to classify unknown digital objects. In particular, as described above, digital classification system 100 can create positive probability functions $f_{k_A}^+(s)$ and imposter probability functions $f_{k_A}^-(s)$ over a range of values of k (i.e., a range of different numbers of tags utilized to train a classification model). For example, in one or more embodiments, digital classification system 100 utilizes k=1, 2, . . . , $k_{max}$. In other embodiments, the digital classification 100 utilizes k=1, 2, 4, 8, 16, 32, 64 . . . , or some other range of tags.

Specifically, in one or more embodiments, digital classification system 100 generates the positive probability functions $f_{k_A}^+(s)$ and imposter probability functions $f_{k_i}^-(s)$ over a range of values of k by generating a plurality of test classification scores based on a plurality of persons portrayed in digital test images. In particular, for each value of k, digital classification system 100 trains a plurality of test classification models utilizing k digital test images. Digital classification system 100 utilizes the trained test classification models to generate a plurality of positive test classification scores and imposter test classification scores. Digital classification system 100 generates a positive histogram and imposter histogram from the test classification scores and generates a positive probability function $f_{k_A}^+(s)$ and imposter probability function $f_{k_i}^-(s)$ by fitting a curve to each resulting histogram. By utilizing a plurality of persons portrayed in digital test images to generate a plurality of test classification models and test classification scores, digital classification system 100 generates probability functions $f_{k_A}^+(s)$ and $f_{k_i}^-(s)$, across a range of values of k, that reflect the probability of obtaining a particular classification score (assuming either a positive match or an imposter, respectively). Moreover, in this manner, digital classification system 100 can generate probability functions $f_{k_A}^+(s)$ and $f_{k_i}^-(s)$, across a range of values of k, that are not specific to the characteristics or biases of a particular individual.

Furthermore, digital classification system 100 can estimate $p(s_i|I)$ (i.e., the probability of obtaining classification score $s_i$ assuming that Person X is in an imposter that does not correspond to persons A, B, C, . . . N) utilizing one or more probability functions. Specifically, digital classification system 100 can estimate $p(s_i|I)$ utilizing $f_{k_i}^-(s_i)$, where $f_{k_i}^-(s_i)$ is the value of an imposter probability function at score value $s_i$; where the imposter probability function is generated based on $k_i$ tags; and where $k_i$ corresponds to the number of tagged images portraying Person i.

Using these estimates, the probability P(A|X) and P(I|X) become:

$$P(A|X) = \frac{f_{k_A}^+(s_A)\left(\prod_{i \neq A} f_i^-(s_i)\right)P(A)}{p(s)}$$

-continued $$P(I|X) = \frac{\left(\prod_{i=1}^{n} f_{k_i}^-(s_i)\right)P(I)}{p(s)}$$

Notably, P(A|X) and P(I|X) have the same denominator, p(s). Moreover, the probabilities P(A|X), P(B|X), P(C|X) . . . P(N|X), P(I|X) that the Person X corresponds to person A, B, C, . . . N or an imposter sums to 1 (i.e., person X must either be an imposter or a tagged person). Accordingly, in one or more embodiments, digital classification system 100 ignores p(s) and simply scales calculated probabilities to 1 after calculating the numerator of the equations outlined above. For instance, one or more embodiments of digital classification system 100 utilizes the following equation to scale the probabilities:

$$P(A|X)+P(B|X)+ \ldots +P(N|X)+P(I|X)=1$$

Moreover, in one or more embodiments, digital classification system 100 assumes that the prior probabilities P(A), P(B), P(C) are the same for all n persons. Thus, in one or more embodiments, P(A) is equivalent to $$\frac{1 - P(I)}{n},$$

where n is the number of persons tagged (i.e., the number of persons A, B, C, . . . N). Thus, before the summing-to-one normalization, the following equations result:

$$P(A|X) = f_{k_A}^+(s_A)\left(\prod_{i \neq A} f_{k_i}^-(s_i)\right)\frac{1 - P(I)}{n}$$

$$P(I|X) = \left(\prod_{i=1}^{N} f_{k_i}^-(s_i)\right)P(I)$$

In one or more embodiments, digital classification system 100 estimates a value for P(I), the prior probability P(I) that a probe image contains an imposter. For instance, in one or more embodiments, digital classification system 100 estimates P(I) based on the probability of imposters in a test repository of digital images. For example, digital classification system 100 can identify the number and probability of imposters in a test repository of digital images.

Similarly, digital classification system 100 can estimate P(I) by analyzing a plurality of digital image repositories collected by various users (e.g., analyzing a plurality of user photo galleries). For example, in one or more embodiments, digital classification system 100 analyzes a plurality of photo galleries, determines the number of tagged individuals, the number of images portraying the tagged individuals, and the number of images portraying untagged individuals. By analyzing the plurality of photo galleries, digital classification system 100 can determine an estimate with regard to the probability of an imposter, P(I), appearing in any particular image.

In one or more embodiments, digital classification system 100 estimates P(I) based on user input. For example, a user can provide an indication to digital classification system 100 regarding the percentage of individuals portrayed in a photo gallery that have been tagged in one or more digital images.

Moreover, in other embodiments, digital classification system 100 utilizes a pre-determined value for P(I) to perform a sample digital object classification, and then utilizes the results of the sample digital object classification to provide a more accurate P(I) estimate. For example, digital classification system 100 can estimate that P(I)=0.5. Digital classification system 100 can utilize the estimated P(I) value to perform a sample digital object classification (e.g., classify persons portrayed in probe digital images into imposters or known Persons A, B, C, . . . , N). Based on the results of the sample digital object classification, digital classification system 100 can obtain a more accurate estimate for P(I) (e.g., 59% of the persons portrayed in digital images were imposters). The digital object classification can then utilize the more accurate P(I) estimate to classify unknown digital objects.

Returning now to FIG. 7, a more specific example will be provided regarding utilizing probability functions to generate normalized classification scores. In particular, with regard to the embodiment of FIG. 7, digital classification system 100 identifies tag-specific probability functions 708, 710 based on the number of tags corresponding to classification scores $s_A$ and $s_B$. Specifically, because score $s_A$ was generated based on eleven tagged images, digital classification system 100 identifies tag-specific probability functions corresponding to eleven tags 708. Similarly, because score $s_B$ was generated based on six tagged images, digital classification system 100 identifies tag-specific probability functions corresponding to six tags 710.

Moreover, as illustrated, tag-specific probability functions corresponding to eleven tags 708 contain positive probability function 720 and imposter probability function 722. Similarly, tag-specific probability functions corresponding to six tags 710 contain positive probability function 730 and imposter probability function 732. As discussed previously, digital classification system 100 generates positive probability functions 720, 730 and the imposter probability functions 722, 732 based on test classifications scores derived from a test repository of digital images.

As mentioned previously, digital classification system 100 can identify probabilities from probability functions based on classification scores. Thus, as illustrated in FIG. 7, digital classification system 100 identifies positive probability 724 from positive probability function 720 based on the value of $s_A$ and identifies imposter probability 726 from imposter probability function 722 based on the value of $s_A$. Similarly, as illustrated, digital classification system 100 identifies positive probability 734 from positive probability function 730 based on the value of $s_B$ and identifies imposter probability 736 from imposter probability function 732 based on the value of $s_B$. Digital classification system 100 then utilizes the values of positive probability 724, imposter probability 726, positive probability 734, and imposter probability 736 to calculate normalized classification scores.

For instance, digital classification system 100 calculates a normalized classification score $N_A$ with regard to classification score $S_A$. Specifically, digital classification system 100 estimates P(A|X) (e.g., based on the equations outlined above) utilizing the following specific values:

$f_{k_A}^+(s_A)$=the value of positive probability 724
$f_{k_A}^-(s_i)$=the value of imposter probability 736
P(I)=0.5 (an estimate, as described above)
n=2 (i.e., only two tagged persons, Person A and Person B)

Similarly, digital classification system 100 estimates P(I|X) (e.g., based on the equations outlined above) utilizing the following specific values:

$f_{k_A}^-(s_A)$=the value of imposter probability 726
$f_{k_B}^-(s_B)$=the value of imposter probability 736
P(I)=0.5 (an estimate, as described above)

In a similar manner, digital classification system 100 calculates P(B|X) (e.g., based on the equations outlined above) utilizing the following specific values:

$f_{k_B}^+(s_B)$=the value of positive probability 734
$f_{k_i}^-(s_i)$=the value of imposter probability 726
P(I)=0.5 (an estimate as described above)
n=2 (i.e., only two tagged persons A and B)

Moreover, as described above, in one or more embodiments, digital classification system 100 scales P(A|X), P(B|X), and P(I|X) to generate normalized classification scores, such that the sum equals one, i.e.:

$$N_A + N_B + N_I = 1$$

Although digital classification system 100 can identify normalized classification scores by scaling probabilities, as just described, in one or more embodiments, digital classification system does not scale probabilities. For instance, in or more embodiments, digital classification system 100 equates normalization scores $N_A$, $N_B$, and $N_I$ to P(A|X), P(B|X), and P(I|X) without to scaling to 1.

Furthermore, as mentioned, in one or more embodiments, digital classification system 100 utilizes normalized classification scores to classify an unknown digital object. Thus, with regard to FIG. 7, digital classification system 100 compares the normalized classification scores $N_A$ and $N_B$ in classifying the unknown individual portrayed in probe digital image 702. In particular, digital classification score 100 compares the normalized classification scores $N_A$ and $N_B$ and identifies the unknown person portrayed in probe digital image 702 based on the highest classification score (e.g., if $N_A$ is the highest normalized classification score, the unknown person corresponds to Person A).

Digital classification system 100 can also compare classification scores corresponding to imposters in identifying a classification. Thus, with regard to the embodiment of FIG. 7, digital classification system 100 can also analyze $N_I$ in classifying the unknown person portrayed in probe digital image 702. For instance, digital classification system 100 can compare $N_A$, $N_B$, and $N_I$ to classify the unknown individual portrayed in probe digital image 702 (e.g., if $N_I$ is the highest normalized classification score, the unknown person is classified as an imposter).

Moreover, digital classification system 100 can also apply one or more thresholds to normalized classification scores in classifying unknown digital objects. In particular, in one or more embodiments, digital classification system 100 establishes a minimum threshold that must be satisfied in order for digital classification system 100 to classify an unknown digital object to a tagged, known digital object. For example, with regard to FIG. 7 and the normalized classification scores, $N_A$ and $N_B$, digital classification system 100 applies an imposter threshold such that digital classification system 100 will identify the unknown person in digital image 702 as an imposter unless $N_A$ or $N_B$ exceed the minimum threshold.

Similarly, digital classification system 100 can also apply a threshold to a normalized imposter classification score, $N_I$. For instance, in one or more embodiments, digital classification system 100 applies a maximum threshold to normalized imposter classification scores. Thus, with regard to FIG. 7, digital classification system 100 can apply a maximum threshold to $N_I$, such that if $N_I$ exceeds the maximum threshold, digital classification system 100 will determine that the unknown person in probe digital image 702 corresponds to an imposter. For example, in one or more embodiments if $N_I$ exceeds 50% (i.e., the probability that the unknown person is an imposter exceeds 50%) digital classification system 100 will identify the unknown person is an imposter.

In this manner, digital classification system 100 can utilize normalized classification scores to classify unknown digital objects.

It will be appreciated that although the discussion of various equations and embodiments with regard to FIG. 7 have utilized an unknown person portrayed in a probe digital image as an example, digital classification system 100 can identify normalized classification scores and classify any variety of unknown digital objects (not simply a person portrayed in digital images). Thus, rather than classify an unknown person portrayed in a probe digital image, digital classification system 100 can classify any unknown object portrayed in a probe digital image. Furthermore, rather than classify a digital image, digital classification system 100 can classify any other unknown digital object. In sum, utilizing the systems and methods disclosed herein, digital classification system 100 can generate normalization scores and classify any unknown digital object.

Figure 8:
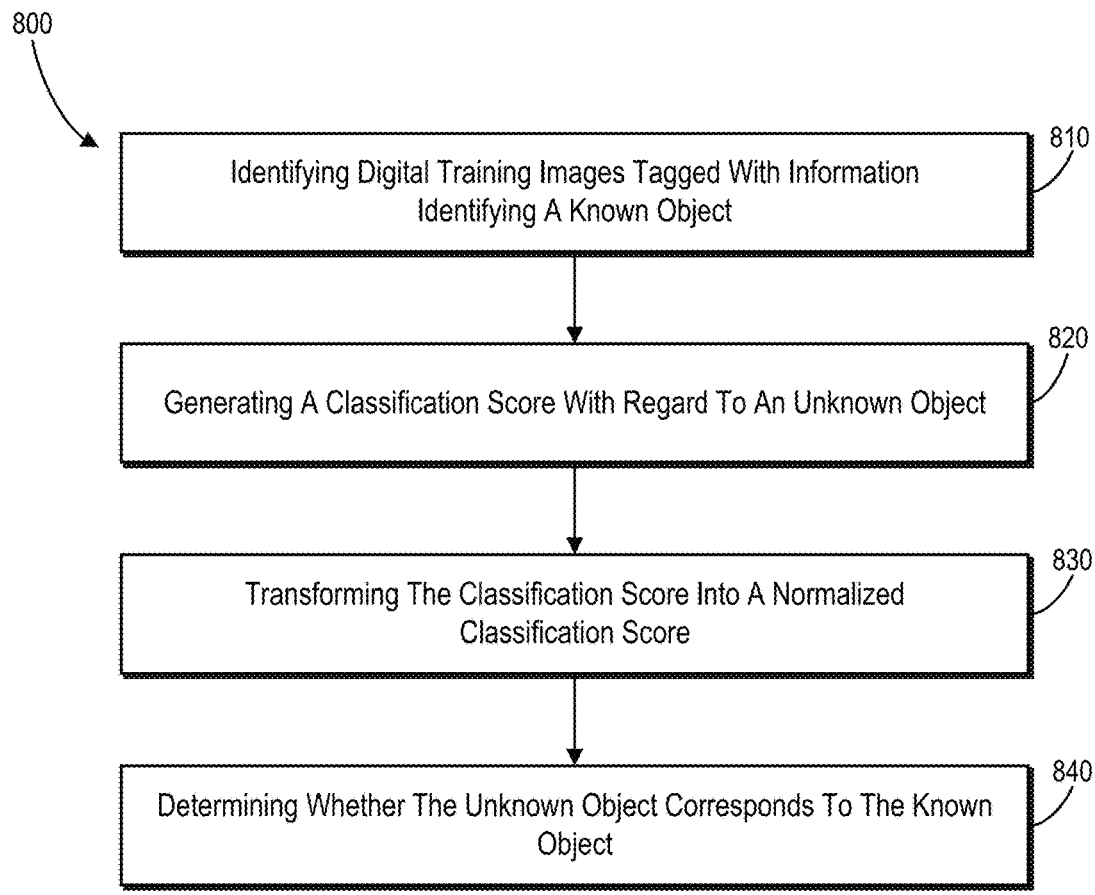
FIG. 8 illustrates a flowchart of a series of acts in a method of classifying unknown digital objects utilizing normalized classification scores in accordance with one or more embodiments.
Figure 9:
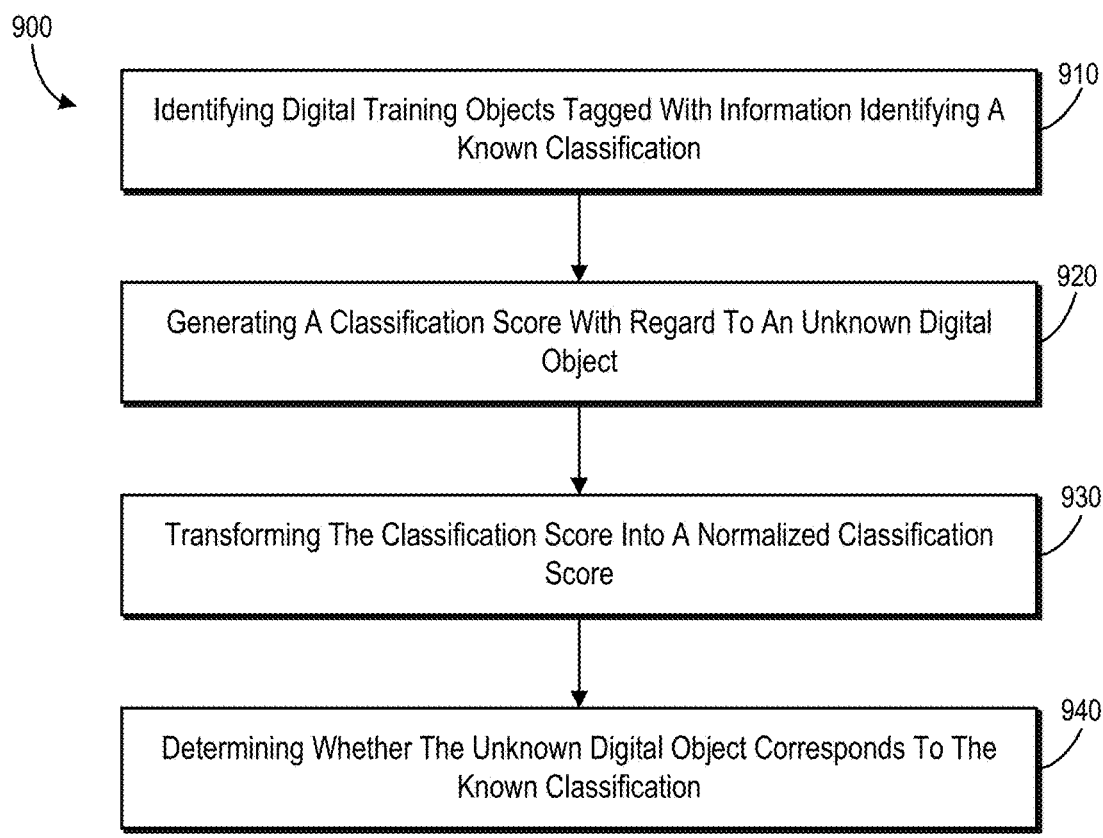
FIG. 9 illustrates a flowchart of a series of acts in a method of classifying unknown digital objects utilizing normalized classification scores in accordance with one or more embodiments.

FIGS. 1-7, the corresponding text, and the examples, provide a number of different systems and devices for generating and utilizing normalized classification scores to classify digital objects. In addition to the foregoing, embodiments of the present disclosure can also be described in terms of flowcharts comprising acts and steps in a method for accomplishing a particular result. For example, FIGS. 8 and 9 illustrate flowcharts of exemplary methods in accordance with one or more embodiments of the present disclosure. The methods described in relation to FIGS. 8 and 9 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of one example method 800 of generating and utilizing normalized classification scores. The method 800 includes an act 810 of identifying digital training images tagged with information identifying a known object. In particular, the act 810 can include identifying a set of one or more digital training images tagged with information identifying a known object, the known object portrayed in each image in the set of one or more tagged digital training images.

As shown in FIG. 8, the method 800 also includes an act 820 of generating a classification score with regard to an unknown object. In particular, the act 820 can include generating, by at least one processor and utilizing the information identifying the known object, a classification score with regard to an unknown object portrayed in a probe digital image, the classification score indicating a likelihood that the unknown object portrayed in the probe digital image corresponds to the known object portrayed in the set of one or more tagged digital training images.

Moreover, as illustrated in FIG. 8, the method 800 also includes an act 830 of transforming the classification score into a normalized classification score. In particular, the act 830 can include transforming the classification score into a normalized classification score based on the number of tagged digital training images in the set of one or more tagged digital training images. In one or more embodiments, the normalized classification score comprises a probability that the known object portrayed in the set of one or more digital training images is the unknown object portrayed in the probe digital image. Moreover, in one or more embodiments, the act 830 includes calculating a probability that, assuming the unknown object portrayed in the probe digital image corresponds to the known object portrayed in the set of one or more tagged digital training images, the generated classification score would result based on the number of tagged digital training images. In addition, the act 830 can include generating a probability function from a repository of digital test images, the probability function reflecting the probability of generating classification scores given the number of tagged digital training images.

Furthermore, the act 830 can include transforming the classification score into the normalized classification score based on the probability function. Moreover, in one or more embodiments the act 830 includes generating an imposter probability function, the imposter probability function reflecting the probability of returning classification scores based on the number of tagged digital training images in the set of one or more tagged digital training images assuming that the unknown object portrayed in the probe digital image does not correspond to the known object portrayed in the set of one or more tagged digital training images.

The method 800 can also include identifying a second set of one or more digital training images tagged with information identifying a second known object, the second known object portrayed in each image in the second set of one or more tagged digital training images; generating, by the at least one processor, a second classification score with regard to the unknown object portrayed in the probe digital image, the second classification score indicating a likelihood that the unknown object portrayed in the probe digital image corresponds to the second known object portrayed in the second set of one or more tagged digital training images; transforming the second classification score into a second normalized classification score based on the number of tagged digital training images in the second set of one or more tagged digital training images; and/or based on the normalized classification score and the second normalized classification score, determining whether the unknown object portrayed in the probe digital image corresponds to the known object portrayed in the set of one or more tagged digital training images.

Accordingly, in one or more embodiments, the act 830 includes generating a second imposter probability function, the second imposter probability function reflecting the probability of returning classification scores based on the number of tagged digital training images in the second set of one or more tagged digital training images assuming that the unknown object portrayed in the probe digital image does not correspond to the known object portrayed in the second set of one or more tagged digital training images.

Moreover, the act 830 can also include calculating a probability of generating the classification score based on the number of tagged digital training images in the set of one or more tagged digital training images utilizing the probability function; and calculating a probability of generating the classification score based on the number of tagged digital training images in the set of one or more tagged digital training images utilizing the imposter function. Similarly, the act 830 can include calculating a probability of generating the second classification score based on the number of tagged digital training images in the second set of one or more tagged digital training images utilizing the second probability function; and calculating a probability of generating the second classification score based on the number of tagged digital training images in the second set of one or more tagged digital training images utilizing the second imposter function.

As illustrated in FIG. 8, the method 800 also includes an act 840 of determining whether the unknown object corresponds to the known object. In particular, the act 840 can include, based on the normalized classification score, determining whether the unknown object portrayed in the probe digital image corresponds to the known object portrayed in the set of one or more tagged digital training images. For example, in one or more embodiments, the act 840 includes comparing the normalized classification score transformed based on the number of tagged digital training images in the set of one or more tagged digital training images with the second normalized classification score transformed based on the number of tagged digital training images in the second set of one or more tagged digital training images.

FIG. 9 illustrates a flowchart of another example method 900 of generating and utilizing normalization scores. Specifically, the method 900 includes an act 910 of identifying digital training objects tagged with information identifying a known classification. In particular, the act 910 can include identifying a set of one or more digital training objects tagged with information identifying a known classification, the known classification corresponding to each of the digital training objects in the set of one or more tagged digital training objects.

As shown in FIG. 9, the method 900 also includes an act 920 of generating a classification score with regard to an unknown digital object. In particular, the act 920 can include generating, by at least one processor and utilizing the information identifying the known classification, a classification score with regard to an unknown digital object, the classification score indicating a likelihood that the unknown digital object corresponds to the known classification.

Moreover, as illustrated in FIG. 9, the method 900 also includes an act 930 of transforming the classification score into a normalized classification score. In particular, the act 930 can include transforming the classification score into a normalized classification score based on the number of tagged digital training objects. For example, in one or more embodiments, the act 930 includes calculating a probability that, assuming the unknown digital object corresponds to the known classification, the generated classification score would result based on the number of tagged digital training objects.

In addition, the act 930 can also include generating a probability function from a repository of digital test objects, the probability function reflecting the probability of generating classification scores given the number of tagged digital training objects; and transforming the classification score into the normalized classification score based on the probability function.

As shown in FIG. 9, the method 900 also includes an act 940 of determining whether the unknown digital object corresponds to the known classification. In particular, the act 940 can include, based on the normalized classification score, determining whether the unknown digital object corresponds to the known classification.

The method 900 can also include identifying a second set of one or more digital training objects tagged with information identifying a second known classification, the second known classification corresponding to each of the digital training objects in the second set of one or more digital objects; generating, by the at least one processor, a second classification score with regard to the unknown digital object; transforming the second classification score into a second normalized classification score based on the number of tagged digital training objects in the second set of one or more tagged digital training objects; and/or based on the normalized classification score and the second normalized classification score, determining whether the unknown digital object corresponds to the known classification.

Accordingly, in one or more embodiments, the act 940 includes comparing the normalized classification score transformed based on the number of tagged digital training objects in the set of one or more tagged digital training objects with the second normalized classification score transformed based on the number of tagged digital training objects in the second set of one or more tagged digital training objects.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
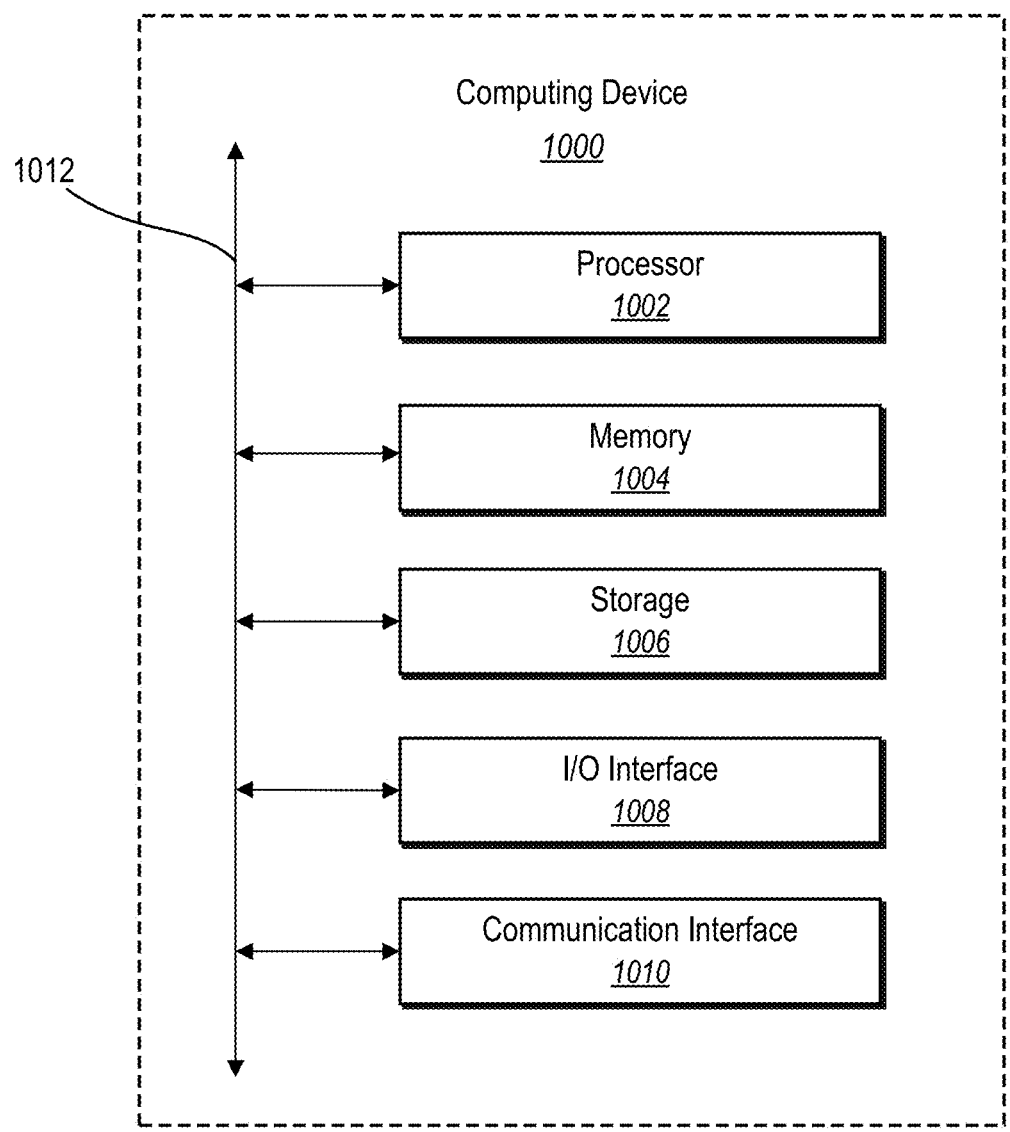
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as computing device 1000 may implement digital classification system 100. As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, computing device 1000 can include fewer components than those shown in FIG. 10. Components of computing device 1000 shown in FIG. 10 will now be described in additional detail.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular embodiments, processor 1002 may include one or more internal caches for data, instructions, or addresses. As an example and not by way of limitation, processor 1002 may include one or more instruction caches, one or more data caches, and one or more translation lookaside buffers ("TLBs"). Instructions in the instruction caches may be copies of instructions in memory 1004 or storage 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive ("HDD"), a floppy disk drive, flash memory, an optical disc, a magneto-optical disc, magnetic tape, or a Universal Serial Bus ("USB") drive or a combination of two or more of these. Storage device 1006 may include removable or non-removable (or fixed) media, where appropriate. Storage device 1006 may be internal or external to computing device 1000. In particular embodiments, storage device 1006 is non-volatile, solid-state memory. In other embodiments, Storage device 1006 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI.

Additionally or alternatively, communication interface 1010 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, communication interface 1010 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port ("AGP") or other graphics bus, an Enhanced Industry Standard Architecture ("EISA") bus, a front-side bus ("FSB"), a HYPERTRANS-PORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 11:
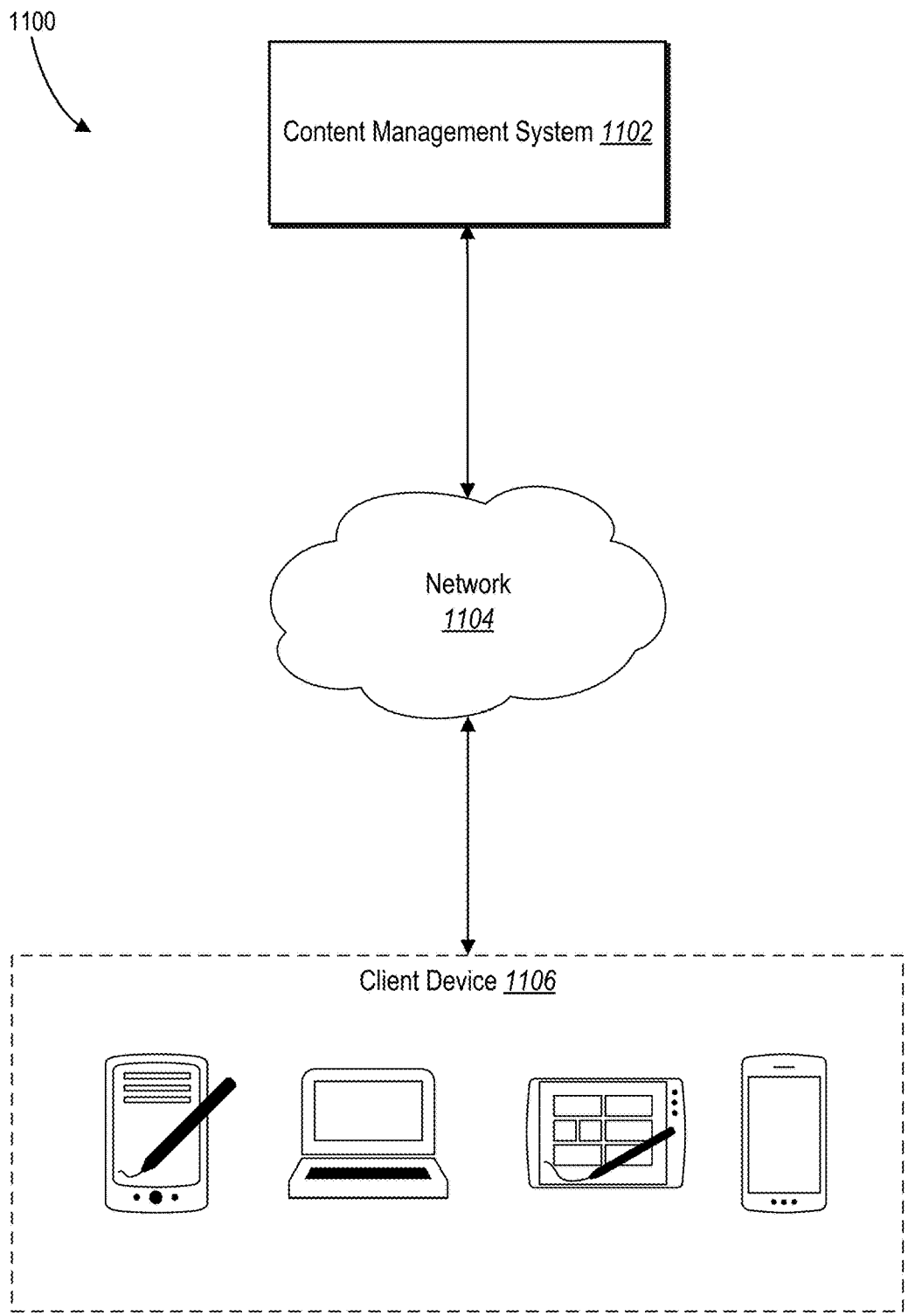
FIG. 11 is an example network environment of a content management system in accordance with one or more embodiments.

FIG. 11 is a schematic diagram illustrating an online content management system 1102 that can work in conjunction with digital classification system 100 and/or operate as another embodiment of digital classification system 100. Online content management system 1102 may generate, store, manage, receive, and send digital content items (e.g., electronic documents, eBooks). For example, online content management system 1102 may send and receive electronic documents to and from client devices 1106 by way of network 1104. In particular, online content management system 1102 can store and manage a collection of content items. Online content management system 1102 can manage the sharing of content items between computing devices associated with a plurality of users. For instance, online content management system 1102 can facilitate a user sharing a content item with another user of digital classification system 100.

In particular, online content management system 1102 can manage synchronizing content items across multiple client devices 1106 associated with one or more users. For example, user may edit a content item using client devices 1106. The online content management system 1102 can cause client device 1106 to send the edited content item to online content management system 1102. Online content management system 1102 then synchronizes the edited content item on one or more additional computing devices.

In addition to synchronizing content items across multiple devices, one or more embodiments of the online content management system 1102 can provide an efficient storage option for users that have large collections (e.g., galleries) of content items. For example, the online content management system 1102 can store a collection of content items, while the client device 1106 only stores reduced-sized versions of the content items. A user can navigate and browse the reduced-sized versions (e.g., eBook cover art) of the content items on client device 1106. In particular, one way in which a user can experience content items is to browse the reduced-sized versions of the content items on client device 1106. Online content management system 1102 may store any number of reduced size versions (e.g., thumbnails) of digital content items and provide them to client device 1106 at a suitable time (e.g., to allow client device 1106 to emphasize one or more digital content items within a graphical user interface).

Client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Application for iPhone or iPad or for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access online content management system 1102.

Online content management system 1102 may also include social network components such as a social network management system. A social network management system may generate, store, manage, receive, and send social network communications. For example, the social network management system may send and receive social network communications to and from client devices 1106 by way of network 1104. In particular, the social network management system can store and manage one or more social network communications sent between co-users of a social network. The social network management system can manage the sharing of social network communications between computing devices associated with a plurality of users. For instance, the social network management system can facilitate a user sharing a social network communication with another user of digital classification system 100.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
   generating, by at least one processor and utilizing a model trained to identify a known object based on a set of digital training images portraying the known object, a classification score with regard to an unknown object portrayed in a probe digital image, the classification score indicating a likelihood that the unknown object portrayed in the probe digital image corresponds to the known object portrayed in the set of digital training images;
   using a probability function reflecting probabilities of returning classification scores, wherein the probability function is specific to the number of digital training images in the set of digital training images, to transform the classification score into a normalized classification score; and
   determining, using the normalized classification score, whether the unknown object portrayed in the probe digital image corresponds to the known object portrayed in the set of digital training images.

2. The method of claim 1, further comprising selecting the probability function specific to the number of digital training images from a plurality of probability functions specific to a plurality of numbers of digital training images.

3. The method of claim 1, wherein the normalized classification score comprises a probability that the known object portrayed in the set of digital training images is the unknown object portrayed in the probe digital image.

4. The method of claim 1, wherein transforming the classification score into the normalized classification score comprises determining a probability of generating the classification score based on the probability function specific to the number of digital training images in the set of digital training images.

5. The method of claim 1, wherein transforming the classification score into the normalized classification score further comprises: determining a probability that, if the unknown object portrayed in the probe digital image corresponds to the known object portrayed in the set of digital training images, the generated classification score would result based on the number of digital training images.

6. The method of claim 1, further comprising using an imposter probability function specific to the number of digital training images in the set of digital training images to transform the classification score into the normalized classification score.

7. The method of claim 6, wherein the imposter probability function specific to the number of digital training images reflects one or more probabilities of returning classification scores based on the number of digital training images given that the unknown object portrayed in the probe digital image does not correspond to the known object portrayed in the set of digital training images.

8. The method of claim 1, wherein the probability function specific to the number of digital training images is generated utilizing a trained classification model to analyze test digital images portraying a test object, wherein the number of test digital images portraying the test object is equal to the number of digital training images.

9. A system comprising:
   at least one processor; and
   at least one non-transitory computer readable storage medium storing instructions that, when executed by the at least one processor, cause the system to:
   generate a classification score with regard to an unknown object portrayed in a probe digital image based on a set of tagged digital training images portraying a known object, the classification score indicating a likelihood that the unknown object portrayed in the probe digital image corresponds to the known object portrayed in the set of tagged digital training images;
   transform the classification score into a normalized classification score based on a probability function reflecting probabilities of returning classification scores, wherein the probability function is specific to the number of tagged digital training images in the set of tagged digital training images; and
   determine, using the normalized classification score, that the unknown object portrayed in the probe digital image corresponds to the known object portrayed in the set of tagged digital training images.

10. The system of claim 9, further comprising instructions that, when executed by the at least one processor, cause the system to select the probability function specific to the number of tagged digital training images from a plurality of probability functions, each specific to one of a plurality of numbers of tagged digital training images.

11. The system of claim 9, further comprising instructions that, when executed by the at least one processor, cause the system to transform the classification score by determining a probability of generating the classification score based on the probability function specific to the number of tagged digital training images in the set of tagged digital training images.

12. The system of claim 9, further comprising instructions that, when executed by the at least one processor, cause the system to use an imposter probability function specific to the number of tagged digital training images in the set of tagged digital training images to transform the classification score into the normalized classification score.

13. The system of claim 12, wherein the imposter probability function specific to the number of tagged digital training images reflects one or more probabilities of returning classification scores based on the number of tagged digital training images given that the unknown object portrayed in the probe digital image does not correspond to the known object portrayed in the set of tagged digital training images.

14. The system of claim 9, further comprising instructions that, when executed by the at least one processor, cause the system to generate the probability function specific to the number of tagged digital training images by utilizing a trained classification model to analyze test digital images portraying a test object, wherein the number of test digital images portraying the test object is equal to the number of tagged digital training images.

15. A non-transitory computer readable medium storing instruction thereon that, when executed by at least one processor, cause a computer system to:
   generate a classification score with regard to an unknown object portrayed in a probe digital image based on a set of tagged digital training images portraying a known object, the classification score indicating a likelihood that the unknown object portrayed in the probe digital image corresponds to the known object portrayed in the set of tagged digital training images;
   transform the classification score into a normalized classification score based on a probability function reflecting probabilities of returning classification scores, wherein the probability function is specific to the number of tagged digital training images in the set of tagged digital training images; and
   determine, using the normalized classification score, that the unknown object portrayed in the probe digital image corresponds to the known object portrayed in the set of tagged digital training images.

16. The non-transitory computer readable medium of claim 15, further comprising instructions that, when executed by the at least one processor, cause the computer system to select the probability function specific to the number of tagged digital training images from a plurality of probability functions, each specific to one of a plurality of numbers of tagged digital training images.

17. The non-transitory computer readable medium of claim 15, further comprising instructions that, when executed by the at least one processor, cause the computer system to transform the classification score by determining a probability of generating the classification score based on the probability function specific to the number of tagged digital training images in the set of tagged digital training images.

18. The non-transitory computer readable medium of claim 15, further comprising instructions that, when executed by the at least one processor, cause the computer system to use an imposter probability function specific to the number of tagged digital training images in the set of tagged digital training images to transform the classification score into the normalized classification score.

19. The non-transitory computer readable medium of claim 18, further comprising instructions that, when executed by the at least one processor, cause the computer system to transform the classification score by determining a probability of generating the classification score based on the imposter probability function specific to the number of tagged digital training images in the set of tagged digital training images.

20. The non-transitory computer readable medium of claim 15, wherein the probability function specific to the number of tagged digital training images is generated by utilizing a trained classification model to analyze test digital images portraying a test object, wherein the number of test digital images portraying the test object is equal to the number of tagged digital training images.

* * * * *